United States Patent [19]
Hatanaka et al.

[11] Patent Number: 6,085,023
[45] Date of Patent: *Jul. 4, 2000

[54] MAGNETIC RECORDING AND REPRODUCING CONTROL APPARATUS

[75] Inventors: Yuji Hatanaka, Yokohama; Yasunori Ohara, Hitachinaka; Hiroaki Tachibana, Hitachinaka; Yoshio Yamada, Hitachinaka; Nobutaka Amada; Hiroo Okamoto, both of Yokohama, all of Japan

[73] Assignee: Hitachi, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/880,641

[22] Filed: Jun. 23, 1997

[30] Foreign Application Priority Data

Jun. 21, 1996 [JP] Japan ..................... 8-161427
Aug. 5, 1996 [JP] Japan ..................... 8-205594

[51] Int. Cl.$^7$ ..................... H04N 5/92
[52] U.S. Cl. ............... 386/98; 386/111; 386/124
[58] Field of Search ................. 386/33, 40, 68, 386/81, 82, 98, 111, 112, 124, 131; 369/54; 360/27, 39, 51, 55, 69

[56] References Cited

U.S. PATENT DOCUMENTS

| 5,745,645 | 4/1998 | Nakamura et al. | 386/131 |
|---|---|---|---|
| 5,819,004 | 10/1998 | Azadegan et al. | 386/112 |

FOREIGN PATENT DOCUMENTS

| 0 710 021 | 5/1996 | European Pat. Off. . |
|---|---|---|
| 0 712 123 A2 | 5/1996 | European Pat. Off. . |
| 0 712 127 A2 | 5/1996 | European Pat. Off. . |
| 0 712 247 A2 | 5/1996 | European Pat. Off. . |
| 7-272414 | 10/1995 | Japan . |

*Primary Examiner*—Wendy Garber
*Assistant Examiner*—Christopher Onuaku
*Attorney, Agent, or Firm*—Evenson, McKeown, Edwards & Lenahan, PLLC

[57] ABSTRACT

A magnetic recording and reproducing apparatus includes an input circuit for inputting the digital signal, an identification information addition circuit for adding recording identification information indicative of recording identification for the digital signal input through the input circuit, a recording circuit for recoding the digital signal with the recording identification information on the recoding medium, a reproducing circuit for reproducing the content of the recording medium, an identification information detecting portion for detecting the identification information from a reproduced signal reproduced by the reproducing circuit for ouputting an identification information detection signal indicative of detection of the identification information, a storage circuit for storing the reproduced signal, a time stamp detection circuit for detecting the time stamp from the reproduced signal stored in the storage circuit, an output control circuit for generating a timing for reading the reproduced signal from the storage circuit on the basis of the time stamp detected by the time stamp detection circuit, a reset circuit for resetting the output control circuit in response to at least the identification information detection signal, and an output circuit for outputting the reproduced signal read from the storage circuit, the identification information addition circuit adding the recording identification information to the digital signal for a given period where the recording circuit initiating recording on the recording medium, and the reset circuit resetting the at least the control circuit upon detection of the recording identification information from the identification information detecting circuit.

24 Claims, 18 Drawing Sheets

SUBCODE

MAIN DATA

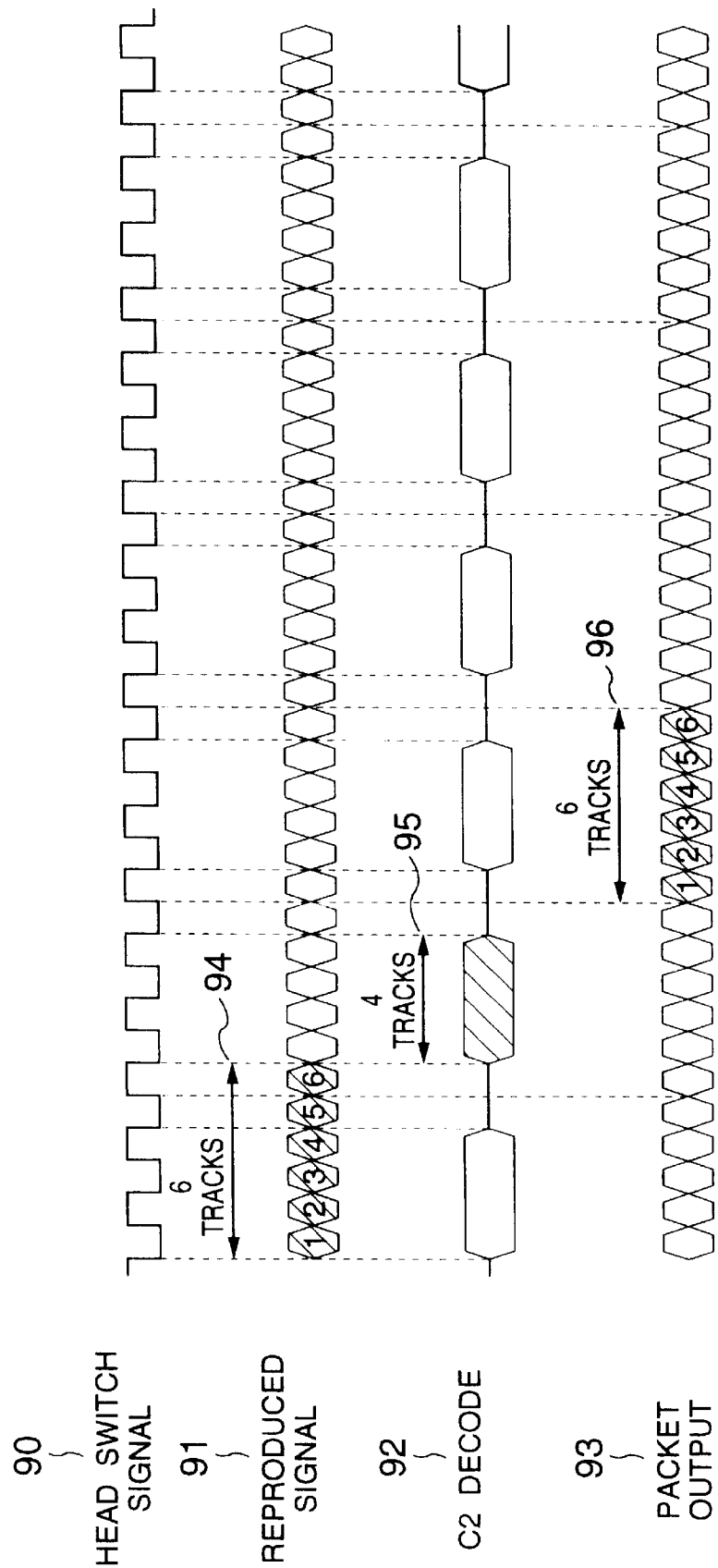

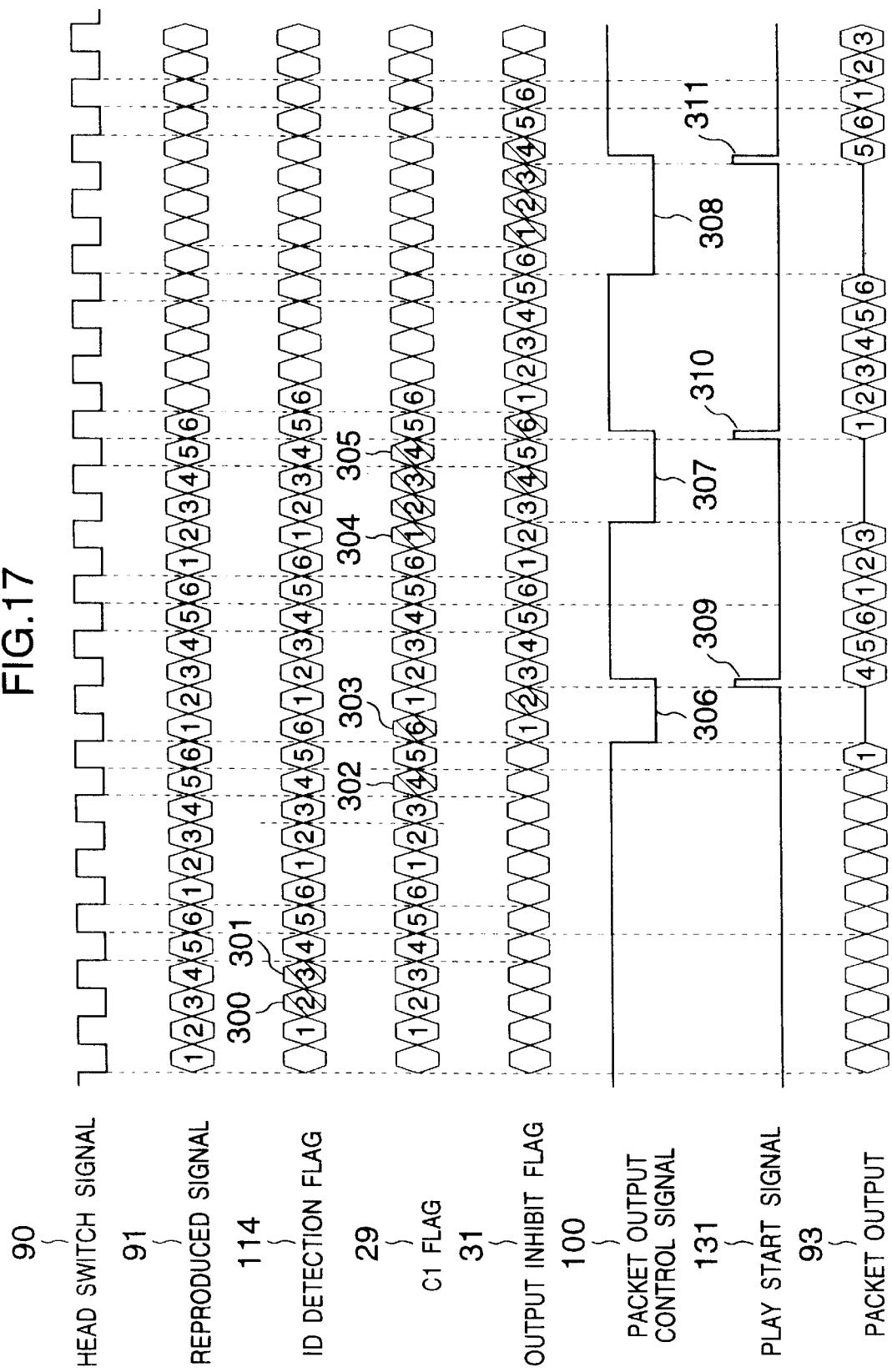

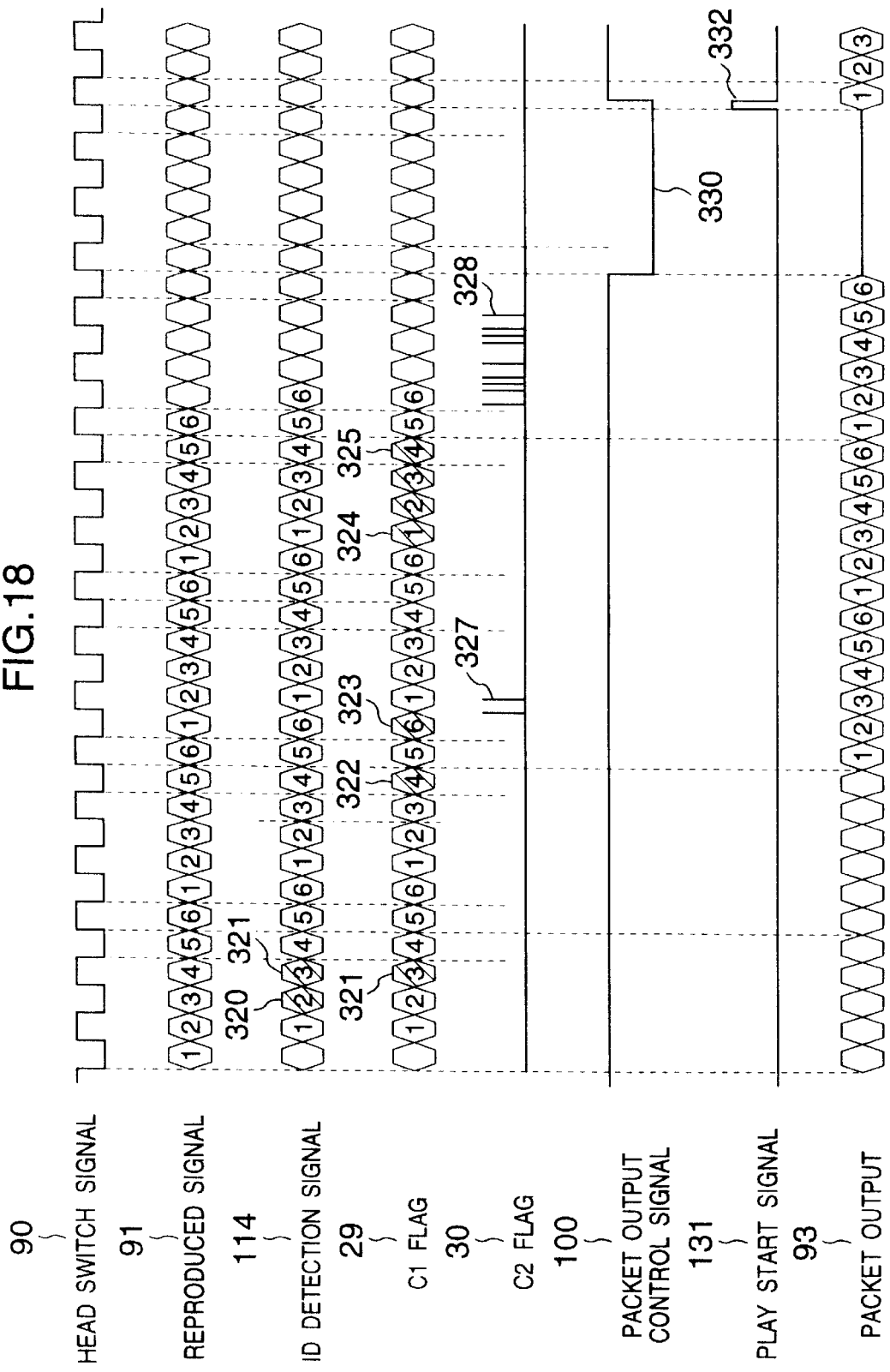

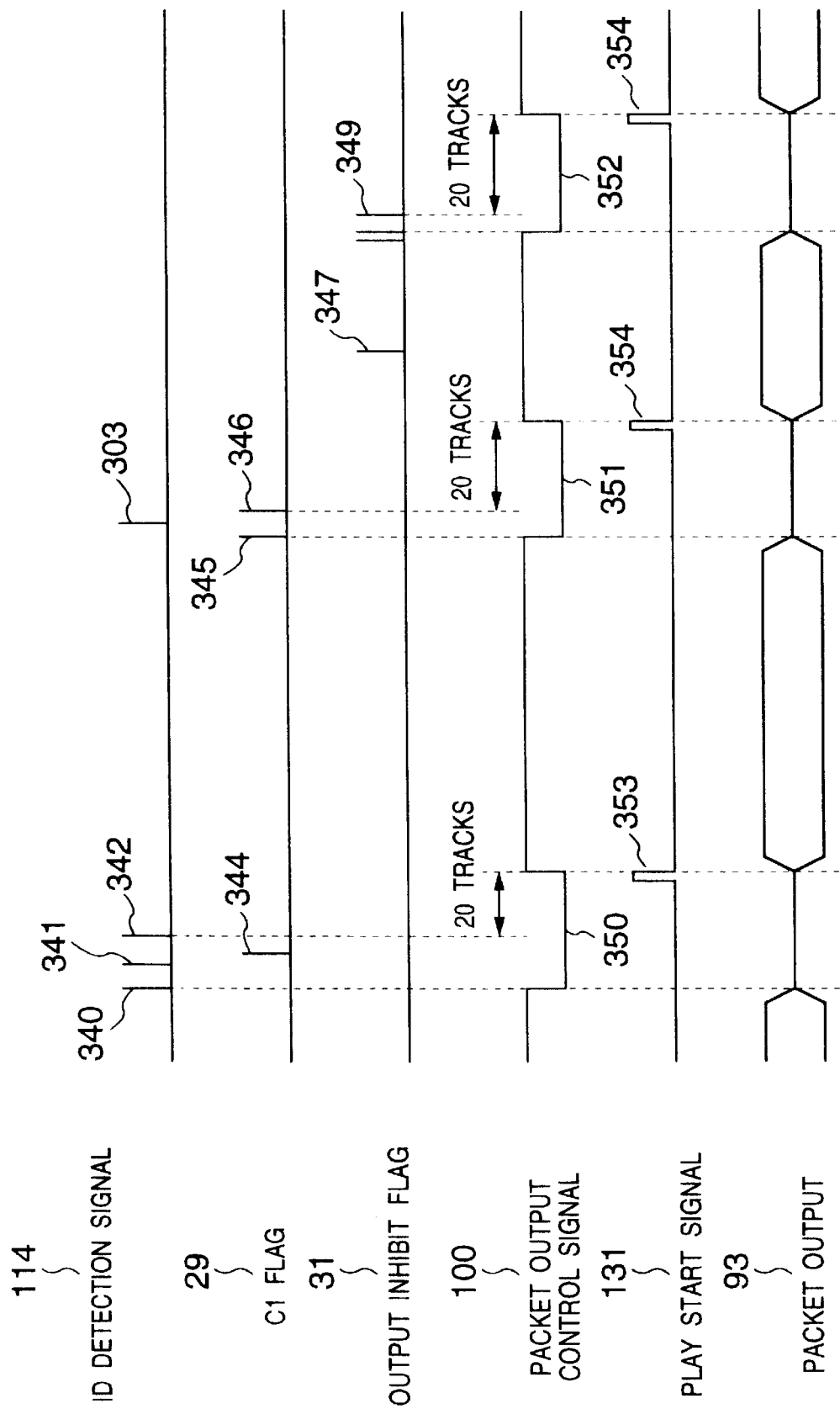

MAGNETIC RECORDING AND REPRODUCING CONTROL APPARATUS

BACKGROUND OF THE INVENTION

The present invention relates generally to reproduction of a compressed digital video signal for home use. More specifically, the invention relates to a magnetic recording and reproducing control apparatus.

As an apparatus for recording and reproducing a compressed digital video signal, there is a digital information reproducing apparatus disclosed in JP-A-7-272414. The disclosed apparatus has a system construction, in which an input compressed digital information signal is recorded as is and, upon reproduction, the compressed digital information signal the same as that upon recording, is output to a decoder or the like to decompress into an image signal and an audio signal by the decoder, for example.

As compression technology, there has been known a system called as MPEG (Moving Picture Expert Group), for example. The MPEG system is a system for transmitting a differential signal with respect to a reference frame utilizing correlation between frames. Therefore, data amount is differentiated per frame to cause difficulty in establishing synchronization between a frame of the recording and reproducing apparatus and a frame of the image.

SUMMARY OF THE INVENTION

An object of the present invention is to provide a magnetic recording and reproducing apparatus, in which malfunction will not be caused in a decoder or so forth even when a jointly filmed portion is reproduced.

According to one aspect of the present invention, a reproducing portion of a magnetic recording and reproducing apparatus includes an input circuit for inputting the digital signal, an identification information addition circuit for adding recording identification information indicative of recording identification for the digital signal input through the input circuit, a recording circuit for recoding the digital signal with the recording identification information on the recoding medium, a reproducing circuit for reproducing the content of the recording medium, an identification information detecting portion for detecting the identification information from a reproduced signal reproduced by the reproducing circuit for outputting an identification information detection signal indicative of detection of the identification information, a storage circuit for storing the reproduced signal, a time stamp detection circuit for detecting the time stamp from the reproduced signal stored in the storage circuit, an output control circuit for generating a timing for reading the reproduced signal from the storage circuit on the basis of the time stamp detected by the time stamp detection circuit, a reset circuit for resetting the output control circuit in response to at least the identification information detection signal, and an output circuit for outputting the reproduced signal read from the storage circuit, the identification information addition circuit adding the recording identification information to the digital signal for a given period where the recording circuit initiating recording on the recording medium, and the reset circuit resetting the at least the control circuit upon detection of the recording identification information from the identification information detecting circuit.

According to the second aspect of the invention, a magnetic recording and reproducing apparatus includes a reproduction circuit for reproducing a signal recorded on the recording medium, an identification information detection circuit for detecting the recording identification information from a reproduced signal reproduced by the reproduction circuit, a storage circuit for storing the reproduced signal, a time stamp detection circuit for detecting the time stamp from the reproduced signal stored in the storage circuit, an output control circuit for generating a timing for reading out the reproduced signal from the storage circuit on the basis of a timing information indicated by the time stamp detected by the time stamp detection circuit, a reset circuit for resetting the output control circuit at least in response to the identification information detection signal, and an output circuit for outputting the reproduced signal read out from the storage circuit, the reset circuit resetting at least the output control circuit when the reproducing identification information is detected by the identification information detection circuit.

With the construction of the present invention set forth above, in case of recording and reproducing the compressed digital signal of forming packet structure, for example, in case of reproducing a recording signal which was temporarily stopped and again recorded thereafter, such as jointly filmed recording manner, reset operation is applied to either the decoder or the packet output control circuit at the jointly filmed recording signal, thereby preventing noise of the video and audio signals, preventing hanging-up of the decoder, and enabling the video and audio signals right after the jointly filmed recording signals to reproduce immediately without causing delay.

BRIEF DESCRIPTION OF THE DRAWINGS

FIG. 5 is a chart showing a reproduction timing of a reproducing signal;

FIG. 17 is a chart showing timing of the first operation for error of the magnetic recording and reproducing apparatus;

FIG. 18 is a chart showing timing of the second operation for error of the magnetic recording and reproducing apparatus;

FIG. 19 is a chart showing a timing of the third operation for error of the magnetic recording and reproducing apparatus;

DESCRIPTION OF THE PREFERRED EMBODIMENTS

Figure 2:
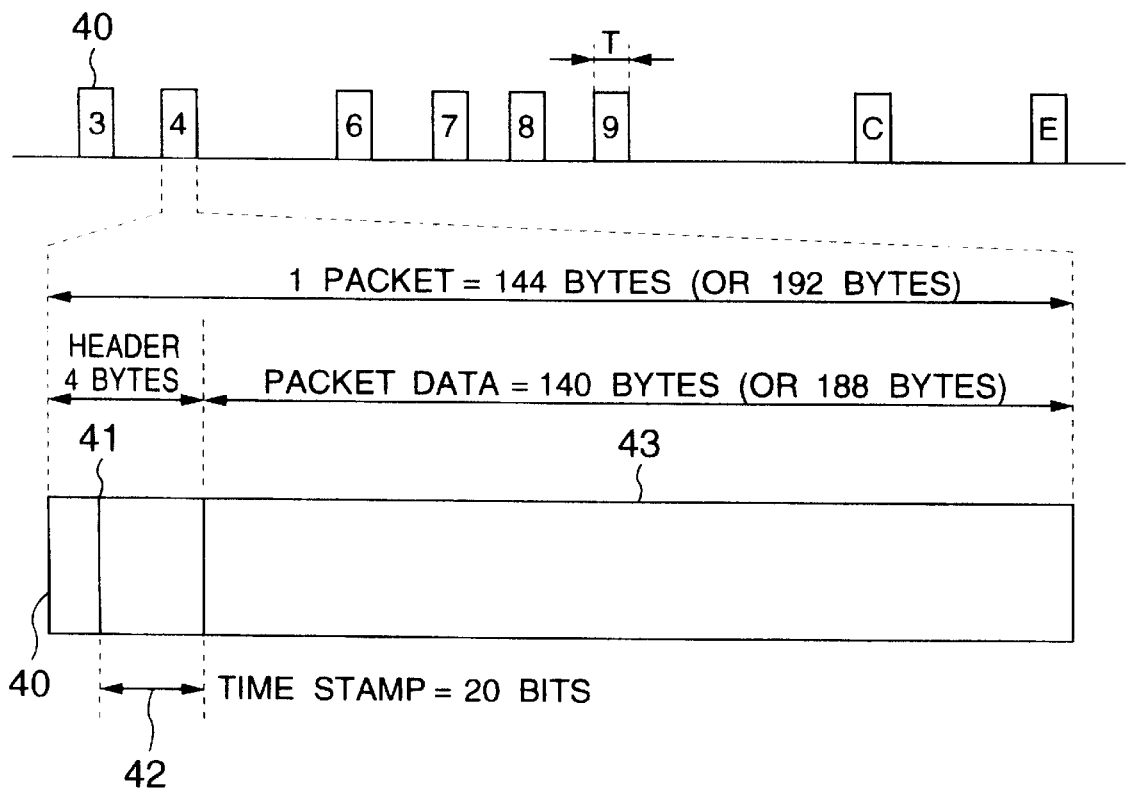
FIG. 2 is an explanatory illustration showing a format of a packet of a compressed digital signal.

For facilitating clear understanding of the present invention, description will be given initially for a digital signal in a packet structure with reference to FIG. 2. A digital information signal can be transmitted in the packet structure as shown in FIG. 2. In FIG. 2, the reference numeral 40 denotes a packet, 41 denotes a header added to the leading end of each packet, and 42 denotes a compressed information signal. Each packet 40 is transmitted in burst manner with non-regular interval. To a time interval, information indicative of a time difference from a certain timing to a timing of actual transmission, which is called as time stamp, is added. In FIG. 2, the information is illustrated as 20 bit time stamp 42. Also, FIGS. 3, 4, 6, . . . shown in respective packets represent the time stamp 42.

Upon recording and reproducing the digital signal having the packet structure shown in FIG. 2, it becomes necessary to record the time stamp 42 added to each packet 40 simultaneously with recording of the packet, and, upon reproduction, each packet has to be output at the same time interval as that upon recording by detecting the time stamp 42.

In a recording and reproducing apparatus of the digital signal having the packet structure with the time stamp as set forth above, when a recording medium, for which edition, such as jointly filming or so forth, is effected, is to be reproduced, the packets becomes discontinuous across an editing point and continuity of the time stamps can be destroyed.

In an MPEG system, since the frame of the image and the frame of the recording and reproducing apparatus are asynchronous, it is not possible to control a position of cut point of the editing point (hereinafter simply referred to as editing point) in the frame of the MPEG data. This possibly cause that the data in the different frame is discontinuously connected at the intermediate position of the frame of the MPEG data. This can results in malfunction of an MPEG decoder to potentially take a long period to obtain video image and audio sound. In the worst case, a system may cause hang up to require resetting of the system to resume system operation.

On the other hand, since an output timing of the packet based on the time stamp even in the recording and reproducing apparatus, since discontinuity of the time stamp can be caused suddenly at the editing point, operation failure, such as overflow of buffer or so forth, for example, tends to be caused in a circuit performing control of the time stamp.

Hereinafter, the preferred embodiment of the present invention will be described with reference to the accompanying drawings.

Figure 1:
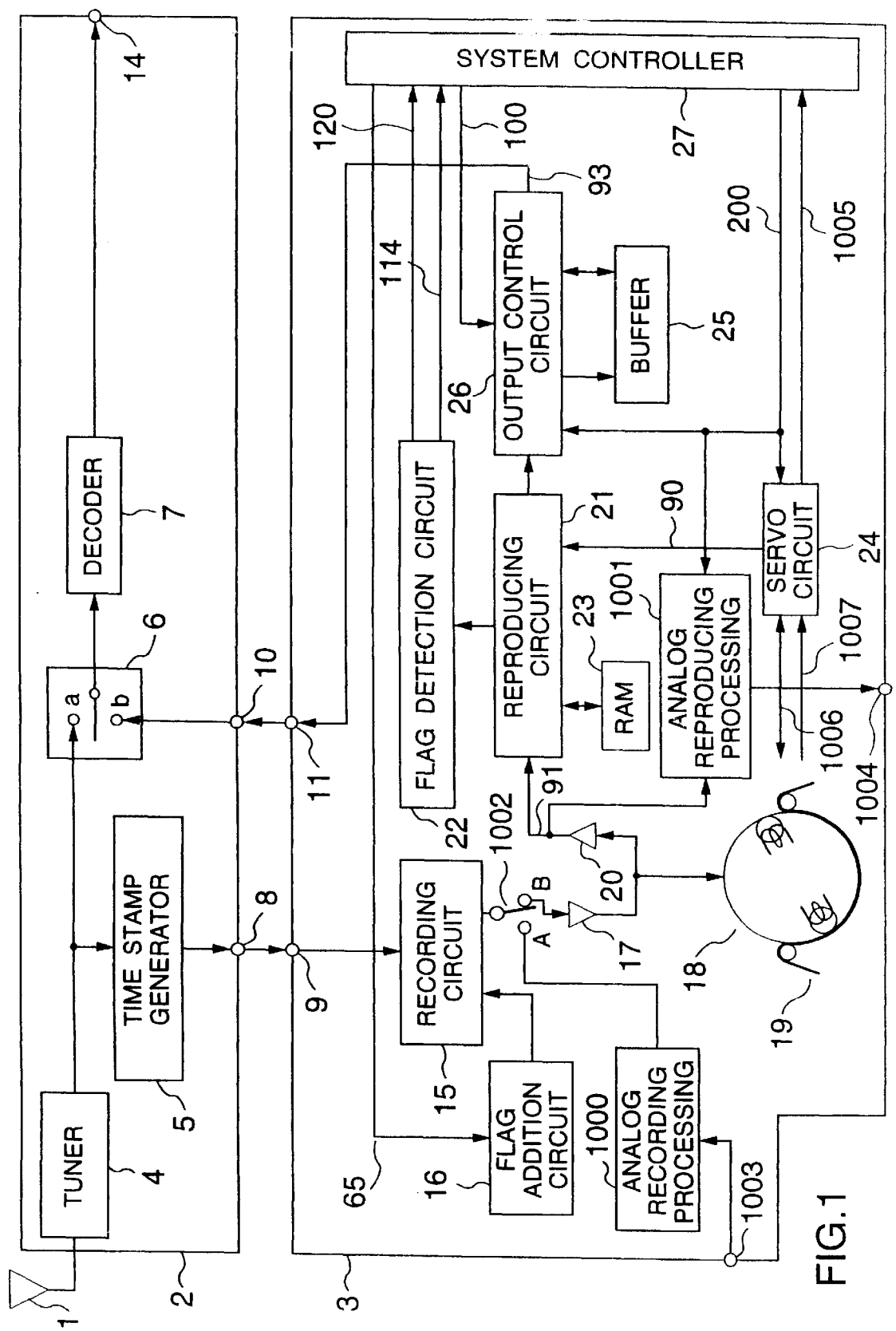
FIG. 1 is a block diagram showing one embodiment of a magnetic recording and reproducing control apparatus according to the present invention.

FIG. 1 shows a schematic block diagram of a digital video tape recorder (VTR) for home use, according to the present invention, which is adapted to record and reproduce a digital broadcast signal compressed by MPEG or so forth, for example, in a form of packet structure described later.

In FIG. 1, the reference numeral 2 denotes a receiver receiving a compressed digital signal broadcasted from a satellite or so forth and performing decoding, such as decompression and so forth, 1 denotes an antenna, 3 denotes a recording and reproducing apparatus for recording and reproducing a digital signal received by the receiver, 4 denotes a receiver circuit, 5 denotes a time stamp generation circuit, 6 denotes a switch, 7 denotes a decoder, 8 denotes a recorded packet output terminal, 9 denotes a recording packet input terminal, 10 denotes a reproducing packet input terminal, 11 denotes a reproduced packet output terminal, 14 denotes an image output terminal, 15 denotes a recording circuit, 16 denotes a flag addition circuit, 17 denotes a recording amplifier, 18 denotes a rotary head, 19 denotes a magnetic tape, 20 denotes a reproduction amplifier, 21 denotes a reproducing circuit, 22 denotes a flag detection circuit, 23 denotes a storage circuit (RAM), 24 denotes a servo, 25 denotes a buffer, 26 denotes an output control circuit and 27 denotes a system controller.

In the receiver 2, a digital signal compressed by an MPEG or so forth, received by the antenna 1 performs decoding process, channel selection, descrambling process and so forth by the receiver circuit 4. Upon decoding the received signal in real time, the switch 6 selects a terminal a to perform process of decompression or so forth by the decoder to convert into an image signal and an audio signal to output through an image output terminal 14. Other elements such as 1000 to 1007 will be described later.

At the same time, a time axis information called as a time stamp is added by the time stamp generating circuit 5, so that the signal having the packet structure shown in FIG. 2 is output through the recorded packet output terminal 8. In FIG. 2, the reference numeral 40 denotes a packet, 41 denotes the header added to the leading end of each packet, and 43 denotes a compressed information signal.

Each packet is transmitted in burst manner with non-regular interval. To a time interval, information indicative of a time difference from a certain timing to a timing of actual transmission, which is called as time stamp, is added. In FIG. 2, the information is illustrated as 20 bit time stamp 42. Also, FIGS. 3, 4, 6, . . . shown in respective packets represent the time stamp 42. Namely, assuming that a time interval labeled T is 1" and others are 0" Transmission timings of respective packets are indicated as the time stamps 42.

Upon recording in the recording and reproducing apparatus 3, the header 41 including the time stamp 42 added by the time stamp generation circuit 5 and the compressed data 43 are input to the recording circuit 15 of the recording and reproducing apparatus 3 via the recorded packet output terminal 8 and the recording packet input terminal 9.

Figure 3:
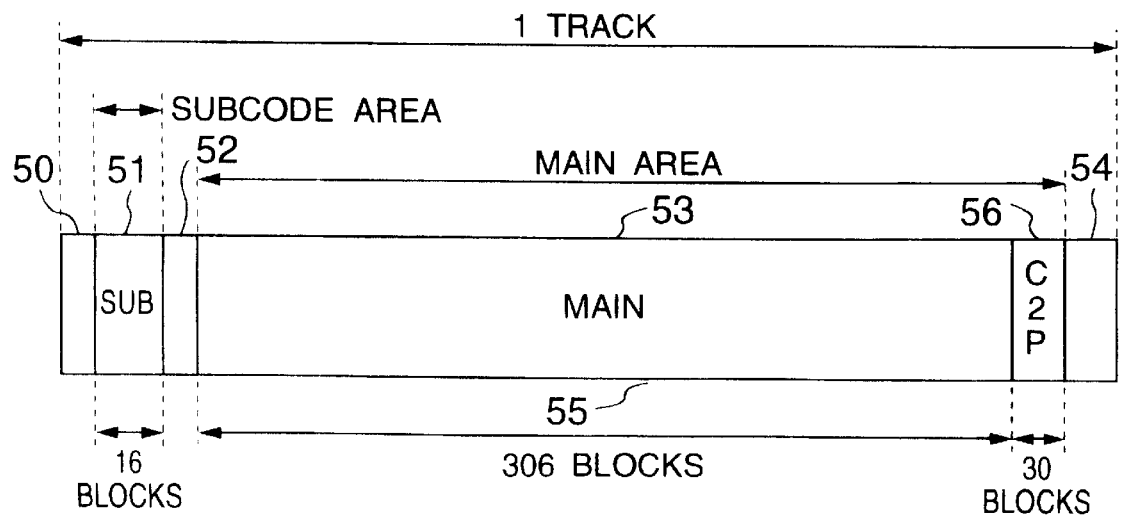
FIG. 3 is an explanatory illustration showing a format of a track on a recording medium.

FIG. 3 is a recording format in the recording and reproducing apparatus 3, in which is shown the recording format for one track to be recorded on the magnetic tape by rotation of the rotary head 18 over 180°. In FIG. 3, the reference numeral 50 denotes a region consisted of a margin 50a and a preamble 50b, 51 denotes a sub-code area, 52 denotes a region consisted of a postamble 52a and a preamble 50b, 53 denotes a main area, and 54 denotes a region consisted of a postamble 54a and a margin 54b. On the other hand, among a main area 53, 55 denotes a compressed digital signal, and 56 denotes an error correction parity. The parity 56 is added for the compressed digital signal 55 for 6 tracks to be complete at 6 tracks.

Figure 4A:
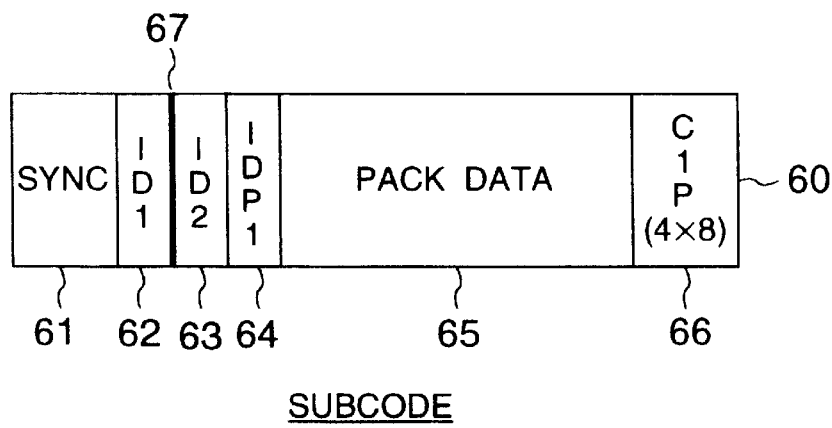
FIGS. 4A and 4B are explanatory illustrations showing format of block on a recording medium.
Figure 4B:
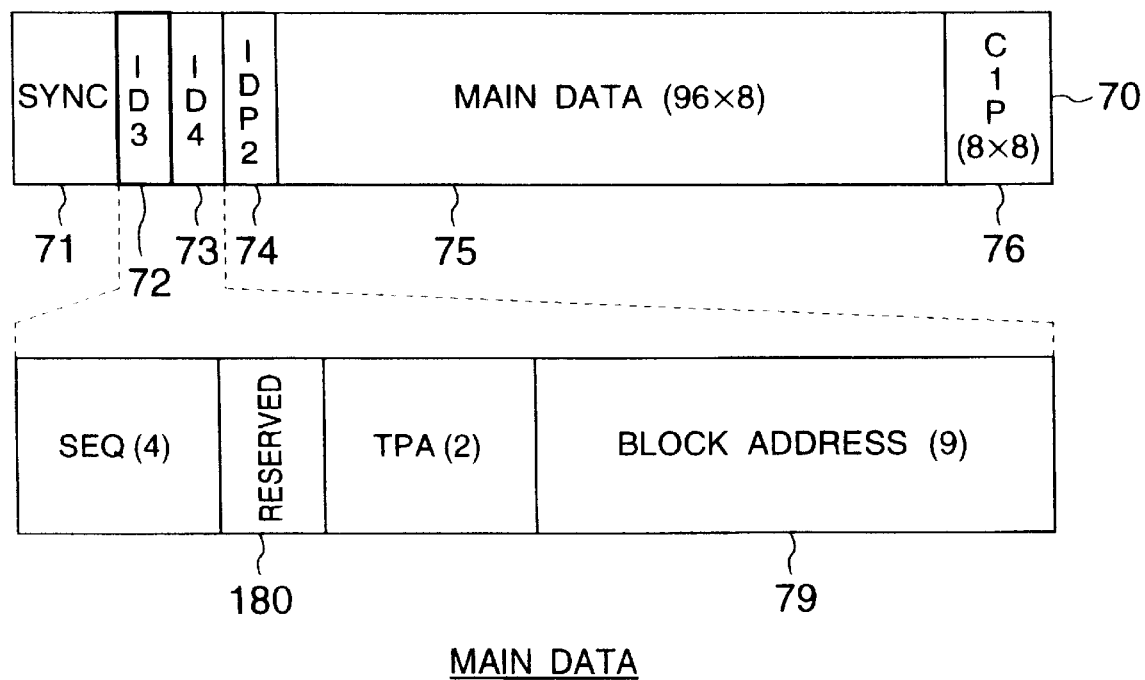

FIG. 4A shows a format of a sub-code recorded in the sub-code area 51, and shows one block. In FIG. 4A, the reference numeral 61 denotes a synchronization signal indicative of the leading end of the block, 62 denotes a region ID1 recording a track number or so forth indicative of absolute track number from the leading end of the magnetic tape 19, 63 denotes a region ID2 recording a start flag or so forth, which will be discussed later, 64 denotes a region IDP recording a parity for detecting error of the region ID1 and the region ID2, 65 denotes a back data having additional information for the signal recorded in the main area 53, 66 denotes a parity for detecting and correcting error of the back data 65. On the other hand, FIG. 4B shows a recording format of the main data to be recorded in the main area and represents one block. In FIG. 4B, the reference numeral 71 denotes a synchronization signal indicative of the leading end of the block, 72 denotes a region ID3 recording a SEQ (sequence number) indicative of a frame information or so forth, a TPA (track pair number) and so forth, 73 denotes a region ID4 recording a block address representative of a position of the block within the track, 74 denotes a region IDP2 recording a parity for detection of error of the region ID3 and the region ID4, 75 denotes a main data as the compressed video signal or so forth, 76 denotes a parity for detecting and correcting error of the main data 75. In the lower column in FIG. 4B, 180 denotes a non-use region, 79 denotes a block address indicative of the position of the block. On the other hand, figures in parenthesizes ( ) represent number of bits.

Recording and reproducing operation in the recording and reproducing apparatus 3 will be discussed hereinafter.

Upon recording, the signal in the packet structure shown in FIG. 2, input from the recording packet input terminal 9 is added the parity 56, the parity 76 and so forth by the recording circuit, added the information of the region ID3, the region ID4 and the region IDP2 by the flag addition circuit 16, added the synchronization signal 71, and provided a modulation process, and is then recorded in the main area 53 of the magnetic tape 19 by means of the rotary head 18. On the other hand, the back data 65 is input to the flag addition circuit 16 by the system controller 27. To the back data 65, the information of the region ID1, the region ID2 and the region IDP1 are added by the flag addition circuit 16, and the synchronization signal 61 is added by the recoding circuit 51 to record in the sub-code area of the magnetic tape by the rotary head 18 via the recording amplifier 17.

Upon reproduction, the data stored on the magnetic tape 19 is reproduced by the rotary head 18 and a reproduction signal is fed to the reproducing circuit 21 via the reproduction amplifier 20. In the reproducing circuit 21, the leading end of the block is detected on the basis of the synchronization signals 61 and 71 to store in the storage circuit 23. For a signal stored in the storage circuit 23, detection and correction of error of the main data by the parities 56 and 76, and detection and correction of error of the back data 65 by the parity 66. On the other hand, by means of the flag detection circuit 22, detection of the information of the region ID1, the region ID2 in the sub-code area 51 is performed, error detection is performed by using the information of the region IDP, and error detection is performed using the information of the region IDP2, to output to the system controller 29 together with the back data 65.

Detection and correction of error using the parities 66 and 67 is completed per one block. Therefore, it may be performed before storing in the storage circuit 23.

Since detection and correction of the error by the parity 56 (C2 decode; error correction using Reed-Solomon code) is completed over 6 tracks, it is performed after reproduction for 6 tracks. After C2 decoding for 6 tracks, the reproduced data is temporarily stored in the buffer via the output control circuit 26. Then, the time stamp 42 included in the main data 75 is detected. Respective packets are read out from the buffer 25 at time intervals indicated by the time stamps 42 and output through the reproduced packet output terminal 11.

FIG. 5 shows a track timing upon reproduction, in which the reference numeral 90 denotes a head switching signal indicative of rotation period of the rotary head 18, 91 denotes a reproduction signal input to the reproducing circuit 21, 92 denotes a timing of C2 decode by the parity 56, and 93 denotes a packet output signal output from the output control circuit 26. As shown in FIG. 5, reproduction signal 94 for 6 tracks shown by 1" to 6" is C2 decoded during period 95 over 4 tracks shown by 95 to output over 6 tracks of the period 96 with an interval of one track. Therefore, the signal reproduced from the magnetic tape 19 is output after 11 tracks.

When the reproduced image of the recording and reproducing apparatus 3 is processed by the receiver 2, the signal input from the reproducing packet input terminal 10 is fed to the decoder 7 by selecting the terminal b of the switch 6 to perform decoding process to obtain the image signal and the audio signal.

Figure 6:
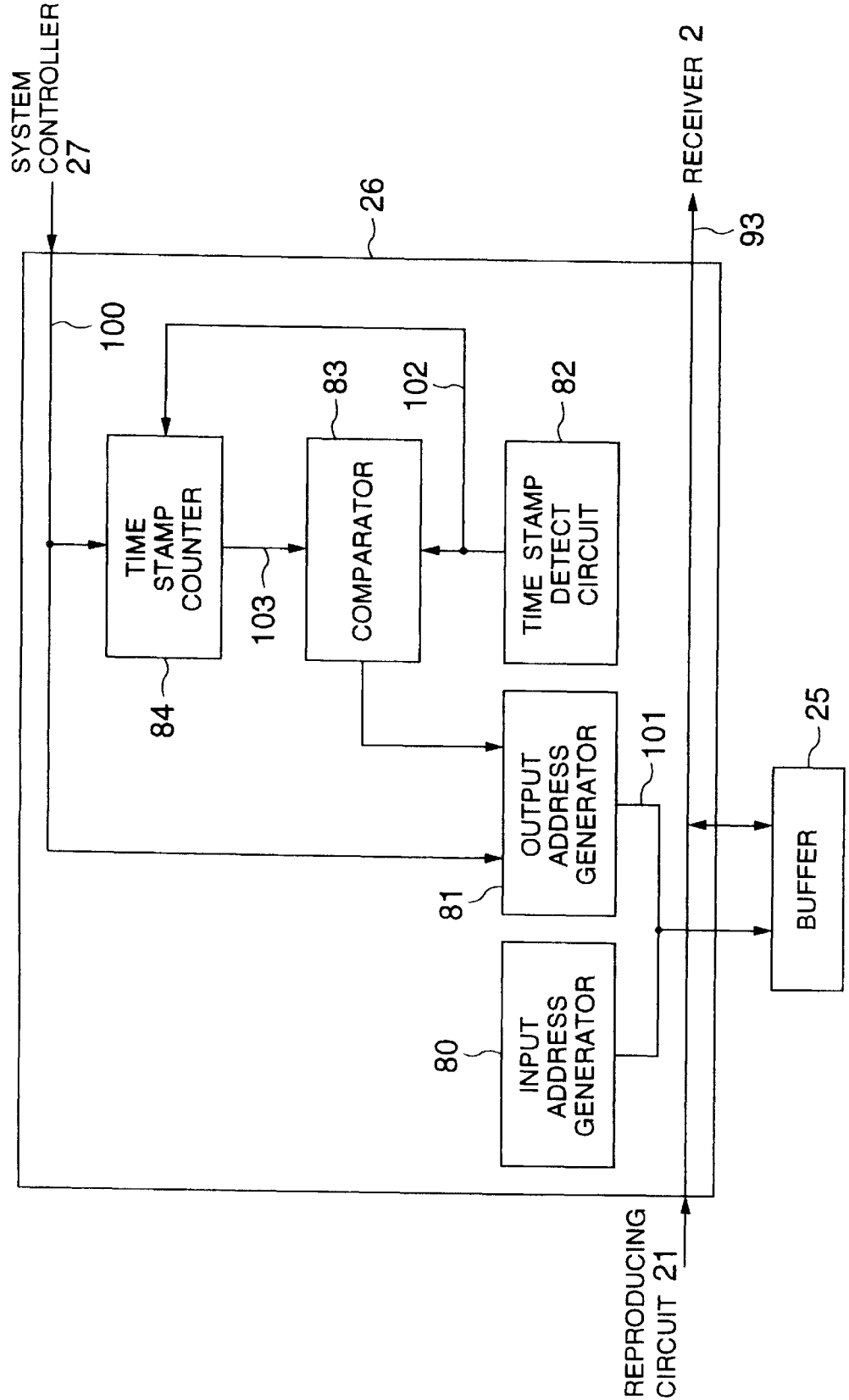
FIG. 6 is a block diagram showing an output control circuit.
Figure 7:
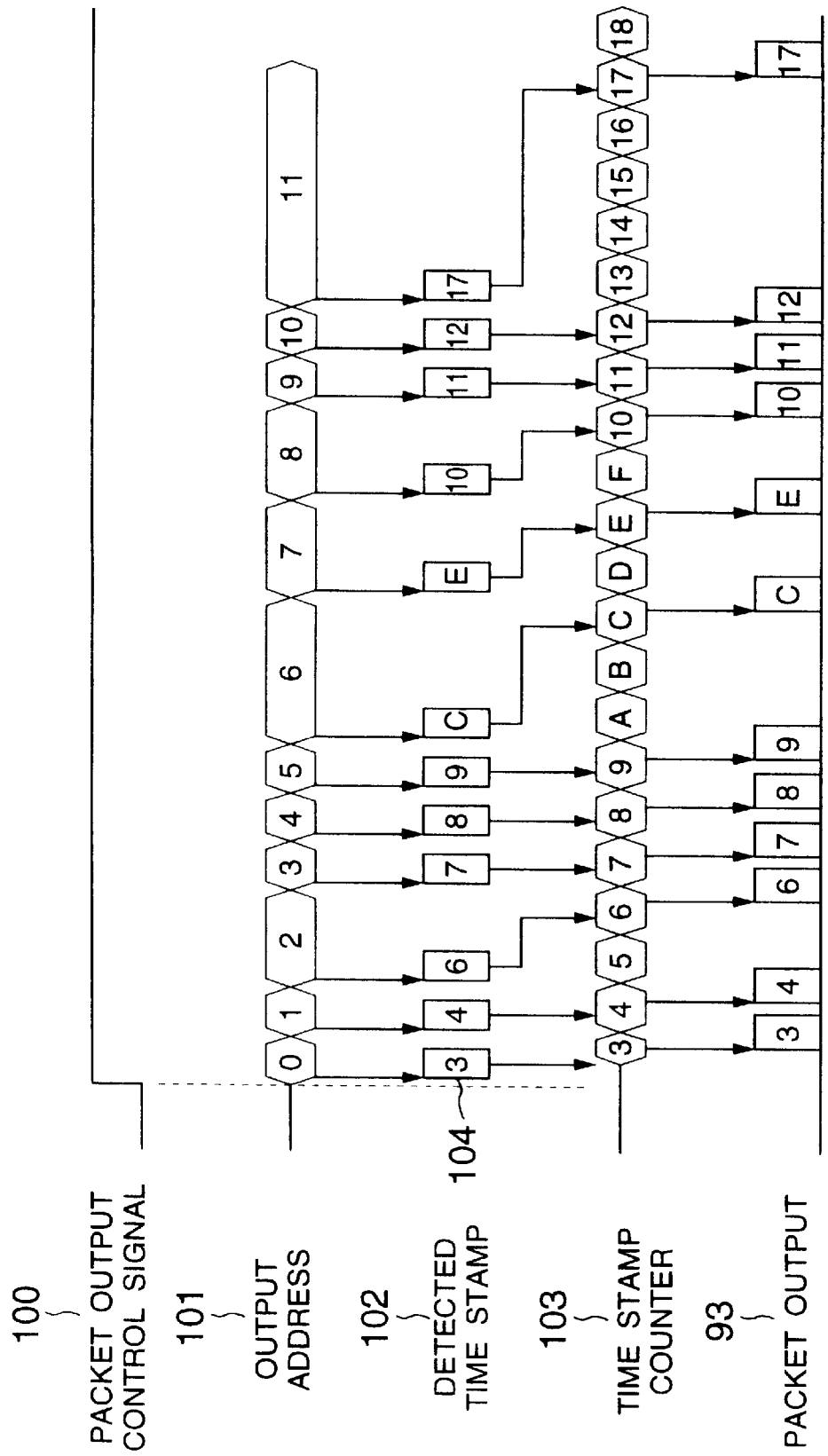
FIG. 7 is a chart showing an operation timing of the output control circuit.

Next, operation of the output control circuit 26 will be discussed with reference to the block diagram of the output control circuit 26 and the buffer 25 shown in FIG. 6 and timing chart of FIG. 7. In FIG. 6, the reference numeral 80 denotes an input address generating circuit controlling an address upon temporarily storing the signal read out from the storage circuit 23 in the buffer 25, 81 denotes an output address generation circuit controlling address upon reading the signal from the buffer 25, 82 denotes a time stamp detection circuit for detecting the time stamp 42 (FIG. 2), 84 denotes a time stamp counter generating a time to be a reference for the time stamp 42, 83 denotes a cooperator circuit for detecting whether the time stamp 102 detected by the time stamp detection circuit 82 and a time generated by the time stamp counter 84 are matched or not. On the other hand, in FIG. 7, the reference numeral 100 denotes a packet output control signal, 101 denotes an output address generated by the output address generation circuit, 102 denotes a time stamp detected by the time stamp detecting circuit 82, and 103 denotes a time axis information generated by the time stamp counter 84.

Upon initiation of packet output, the packet output control signal 100 rises from the system controller 27. The output control circuit 26 is initialized with taking the rising of the packet output control signal 100 as the trigger point to initiate operation. At first, the first time stamp 102 detected by the time stamp detection circuit 82 is loaded to the time stamp counter 84. The time stamp counter 84 is the 20 bit counter. Subsequently, the time stamp counter 84 repeats count-up operation at a predetermined frequency (e.g. 27 MHZ). After outputting of the first packet, the output address is advanced. Then, the time stamp 102 of the next packet is read out from the buffer 25 to make judgment whether the time stamp 102 and the timing indicated by the time stamp 102 are matched or not by the cooperator circuit 83. If matched, the packet is read out from the buffer 25. If not matched, matching of the time 103 of the time stamp counter and the detected time stamp 102 is waited to read out the packet from the buffer 25 upon detection of matching.

By this, it becomes possible to output the packet at the time interval consistent with the time interval upon recording.

Next, in order to make the invention clear, joint filming according to the present invention will be discussed from technical background of the present invention.

Joint filming is to jointly record the video data for the already recorded portion. For example, joint filming may occur upon depression of a pause button during recording and subsequently release from pause to resume recording. When the video information thus recorded on the medium is to be recorded, particularly, when the recorded video information is the compressed digital signal, problem should be encountered.

Figure 12:
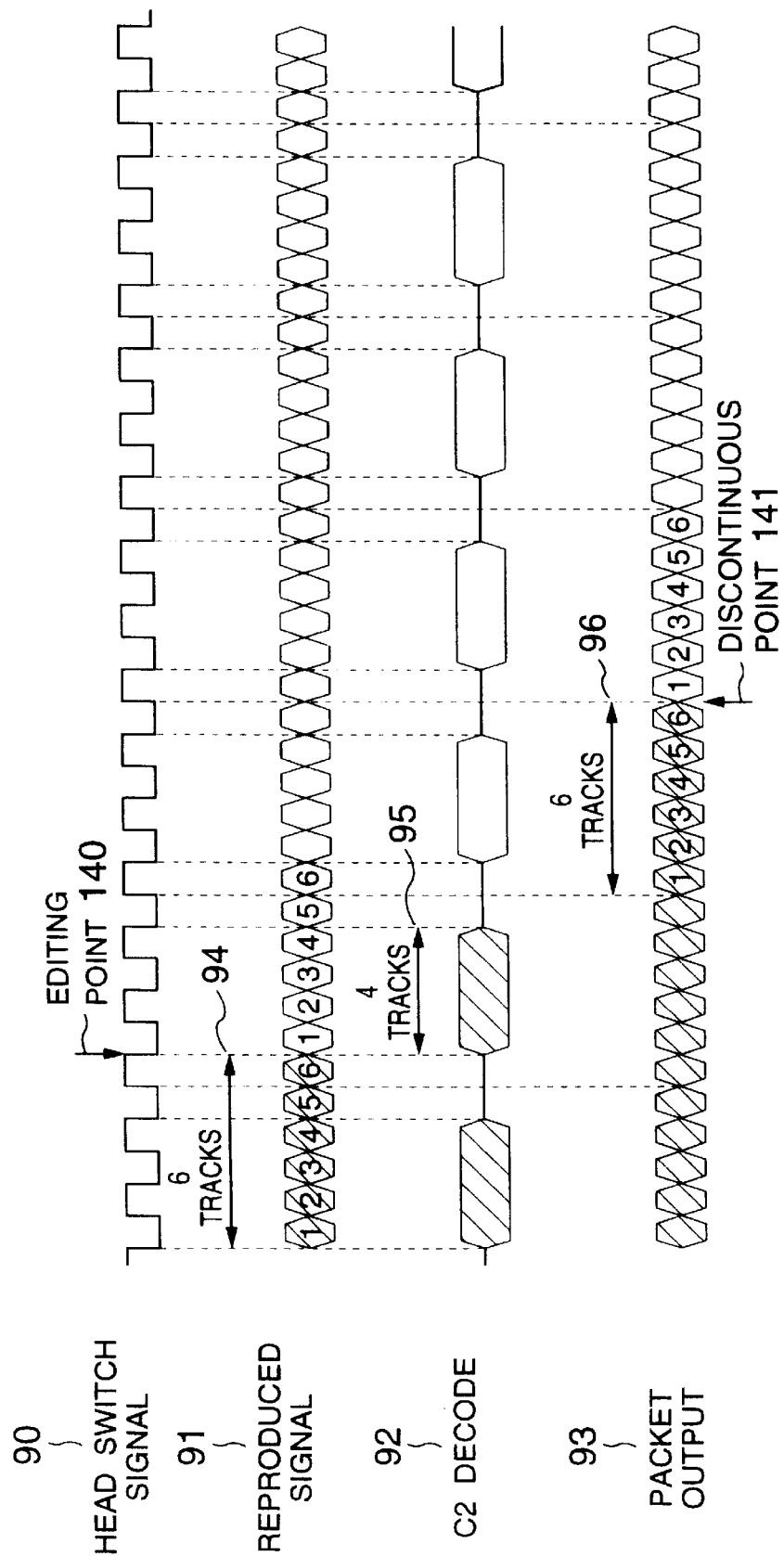
FIG. 12 is a chart for explaining general relationship at the editing point of the reproducing signal.
Figure 13:
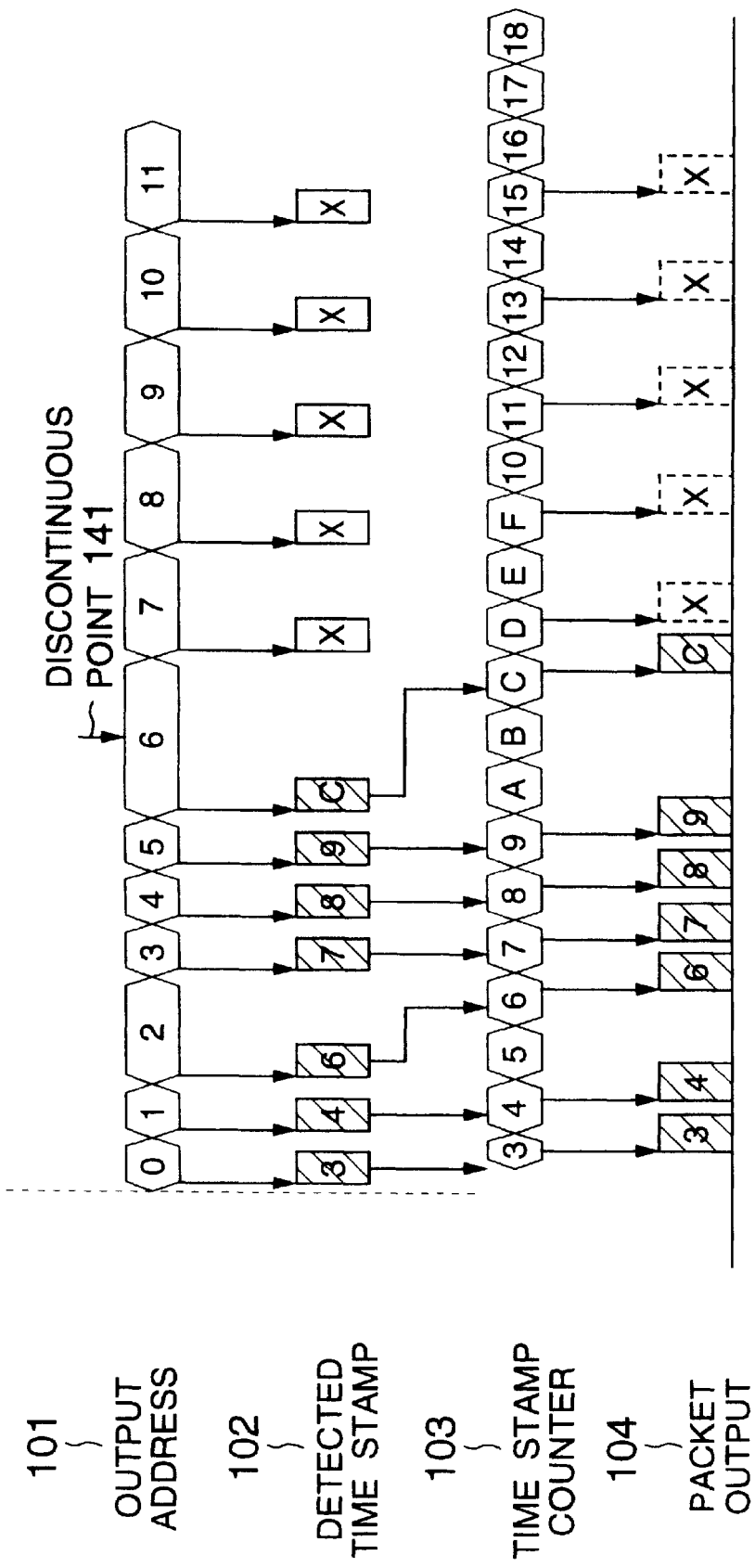
FIG. 13 is a chart for explaining timing of general operation at the editing point of an output control circuit.

FIG. 12 shows a reproduction timing of the joint filming (Hereinafter referred to as the editing point), and FIG. 13 shows an operation timing of the output control circuit at that timing. In FIGS. 12 and 13, the data before the editing point 140 are indicated as 1" to 6" with hatching. In case of joint filming where the editing point 140 is located at the cut point of 6 tracks where C2 decoding is completed as shown in FIG. 12, error may not be detected by error detection by the parity (C1 parity) 76 or by error correction by the C2 decoding. Therefore, output to the receiver 2 is made in the condition where continuity of the packet output 93 is destroyed. Therefore, the decoder 7 of the receiver 2 should cause malfunction to cause large noise on the image or voice, to cause hang up in operation, to take long period to obtain the image or voice, or in the worst case, to require resetting of the system.

On the other hand, as shown in FIG. 13, in the output control circuit 26, continuity of the detected time stamps 102 may be destroyed across the discontinuing point 141. At this time, since correlation of the values before and after the discontinuing point 141 cannot be established, matching with the timing 103 of the time stamp counter 84 cannot be established as discussed with respect to FIG. 6. Thus, output from the buffer 25 cannot be guaranteed to cause overflow condition to possibly cause necessity of resetting of the buffer 25.

In the foregoing case, since error cannot be not detected, discontinuing point 141 cannot be detected. Either on the recording and reproducing apparatus side or the receiver side 2, it is not possible to avoid occurrence of malfunction.

Therefore, in the present invention, a start flag is recorded on the magnetic tape for a predetermined period in the recording start portion (including starting of recording after interruption of recording in pause mode). On the magnetic tape 19, start flag is recorded. Utilizing the start flag, detection of the editing point is performed upon reproduction for resetting the recording and reproducing apparatus 3 and the receiver 2.

The start flag 67 is written in the single MSB (most significant bit)of the region ID2 by the flag addition circuit 16, as shown in FIG. 4A. Upon initiation of recording, the start flag 67 is written for 300 tracks, for example, to be used for versing-up.

Figure 8:
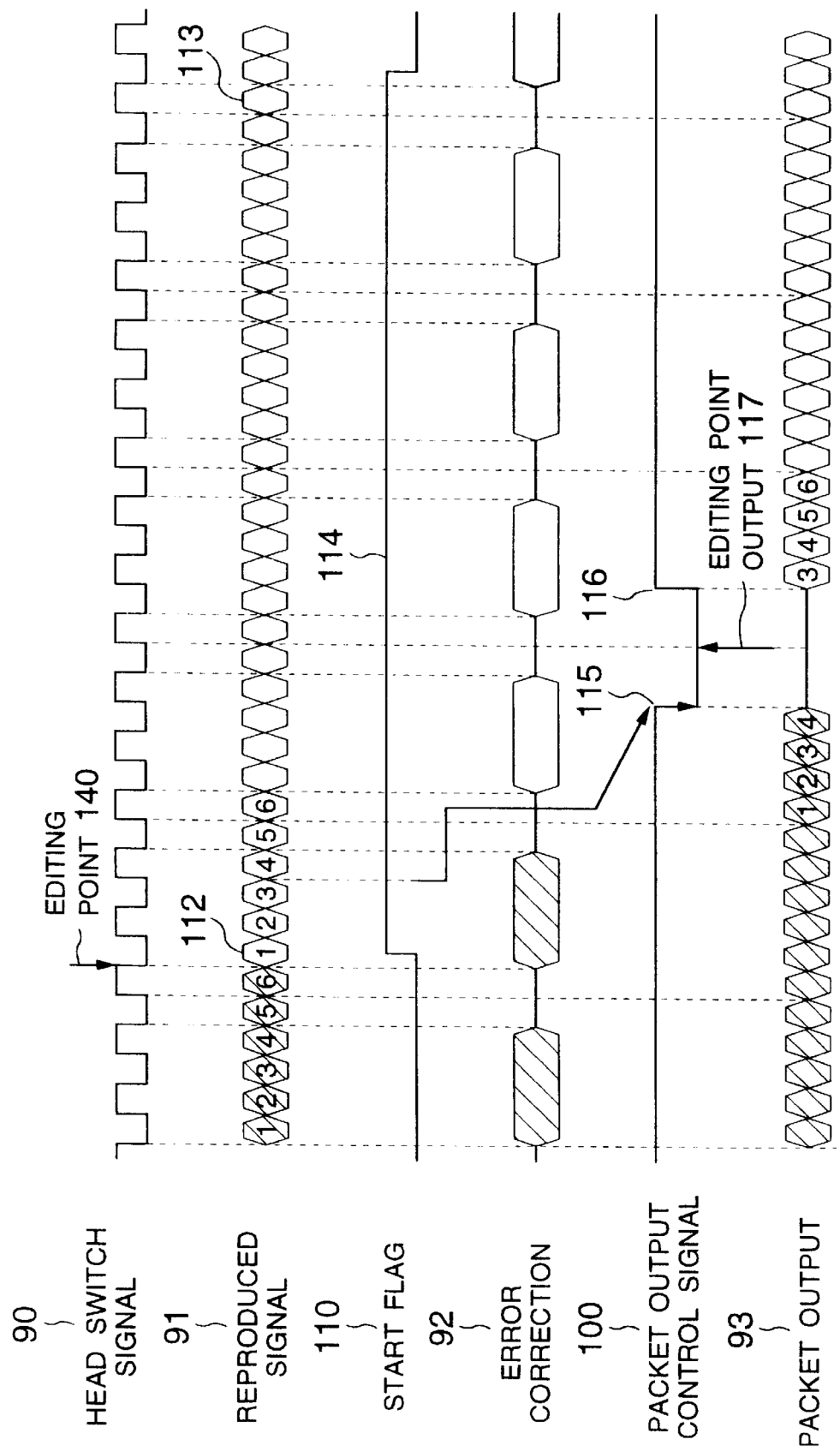
FIG. 8 is a chart showing a timing of a first operation at an editing point of a reproducing signal.

Reproduction timing in the case where the start flag 67 is recorded on the editing point 140 on the printing medium, is shown in FIG. 8. Here, it is assumed for simplification that the start flag 67 is recorded for 30 tracks (from track 112 to track 113) upon initiation of recording. Similarly to FIG. 12, the data before the editing point is 1" to 6" with hatching. Upon reproduction of the data recorded on the track 112, when the start flag is detected by the flag detection circuit 22, a flag detection signal 114 is output to the system controller 27. The packet output timing of the editing point 140 is delayed for 11 tracks as set forth above, the system controller 27 makes the packet output control signal L level once before and after the output timing 117 of the editing point 140 (timings 115 to 116) to stop output of the output control circuit 26 and thus to reset control of the buffer 25. By this, output of packet is interrupted before and after the editing point 140 to prevent the packet not continuous in the time axis from being output to the decoder 7. At a timing 116 of outputting the not continuous packet from the system controller 27, the packet output control signal 100 is risen for resetting initial condition of the output control circuit 26 to prevent operation failure of overflow of the buffer 25.

If the packet output interrupting period from timing 115 to the timing 116 is set over the overall period where the start flag is set, the packet should be interrupted for a long period. Therefore, as shown in FIG. 8, interruption is made only for a given period by determining a period from the detection initiation track. In the alternative, the output of packet may be interrupted from output timing of the editing point.

At set condition where the start flag 67 is set, only error detection by the region IDP1 is performed and thus reliability is generally low. Reliability may be enhanced by checking continuous matching or majority matching of the start flags recorded in respective blocks within one track. Also, by checking continuous matching over several tracks, reliability can be further enhanced. In FIG. 8, three tracks from the track 112 of the reproduction signal 91 are judged as the editing point by detecting the start flags set therein, respectively. Such matching process may be performed either the flag detection circuit 22 or the system controller 27.

Figure 14:
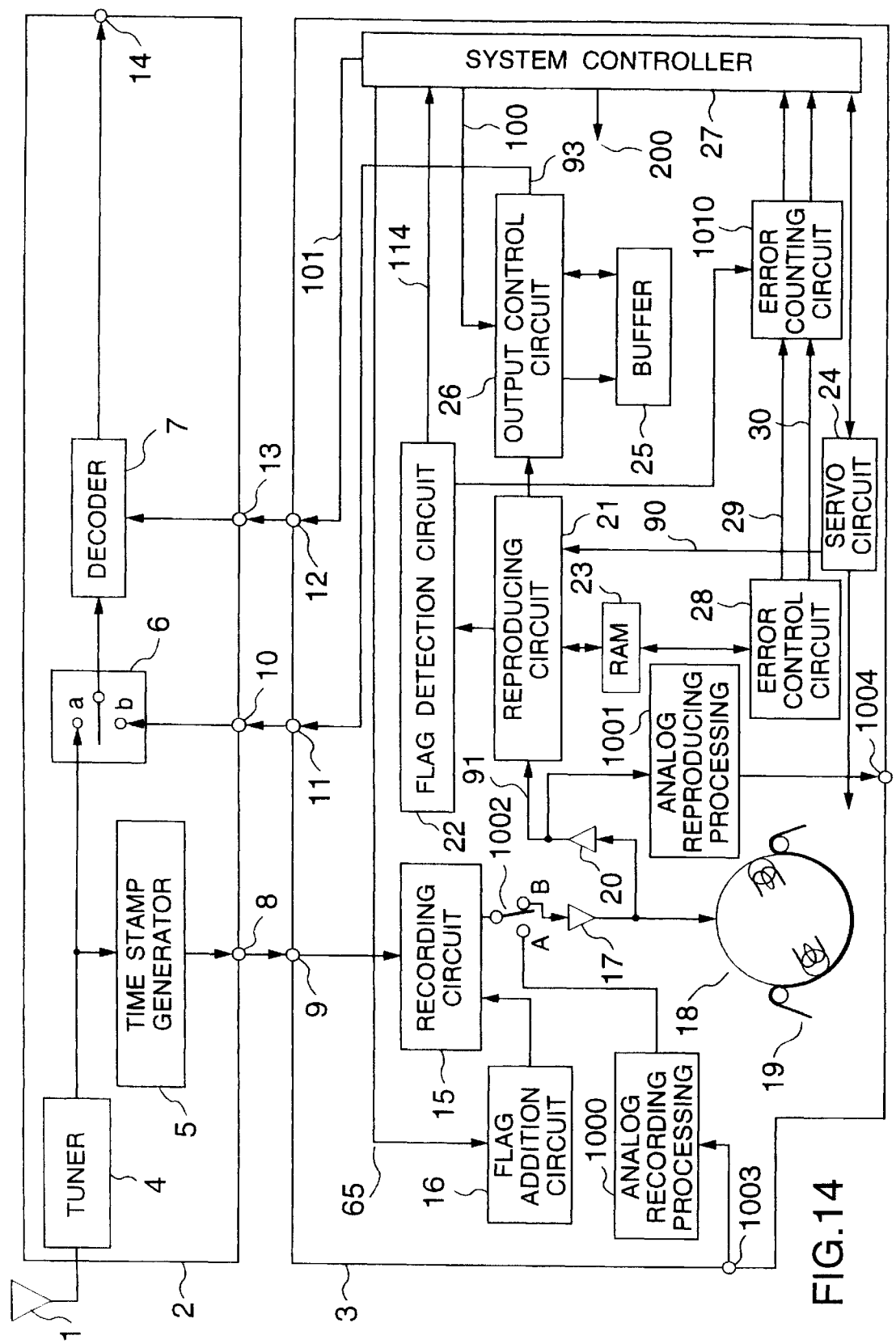
FIG. 14 is a block diagram showing a further embodiment of the magnetic recording and reproducing apparatus according to the present invention.

In the recording medium 19, in which no start flag 67 is recorded, detection of the editing point 140 cannot be performed. Accordingly, in the present invention, there is a method to detect the editing point utilizing frame information stored in the region ID3 in the main area 53. An example of the circuit for detecting the editing point 140 utilizing the frame information is illustrated in FIG. 14. The circuit construction shown in FIG. 14 is the same as those of FIG. 1 except for the error control circuit 28 and except that the flag addition circuit 16 in FIG. 1 is renamed as an ID addition circuit 16 and the flag detection circuit 22 is renamed as an ID detection circuit 22. Thus, the detailed discussion is neglected for keeping the disclosure simple enough to facilitate clear understanding of the invention, and only operation will be discussed later in detail with reference to FIG. 14.

In the region ID3 in the main area as referred to FIG. 4B, the foregoing information TPA which is varied from 0 to 2 per every two tracks and information SEQ which is incremented from 0 to 15 per every six tracks are stored as the frame information. Therefore, at the editing point 140, it is possible that the frame information becomes discontinuous.

Figure 9:
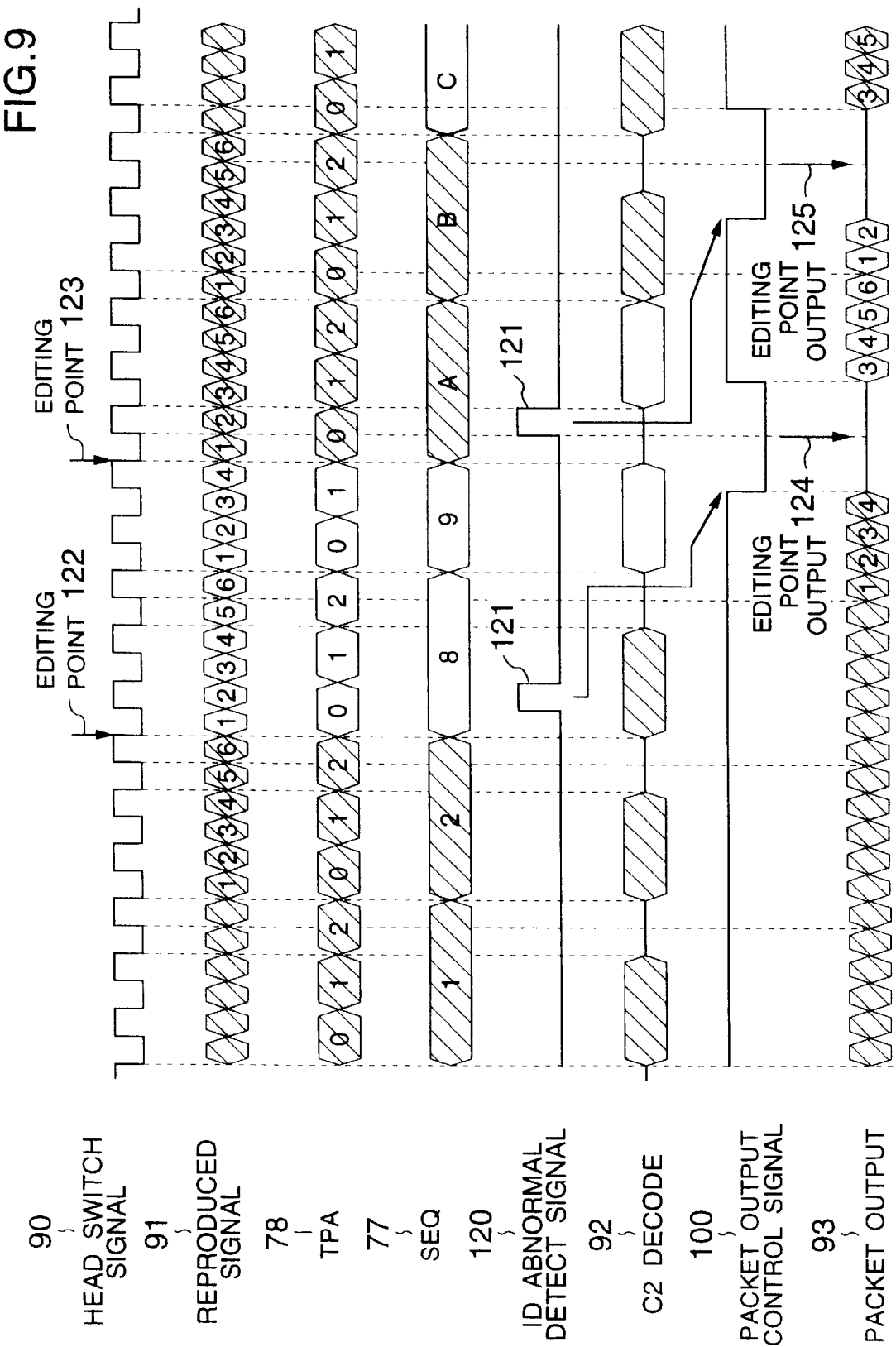
FIG. 9 is a chart showing a timing of a second operation at an editing point of a reproducing signal.

For example, as shown in FIG. 9, when joint filming is performed at the editing point 122, the information SEQ becomes discontinuous. On the other hand, in case of the editing point 123, the information TPA becomes discontinuous. When discontinuity of information SEQ and the information TPA is detected by the ID detection circuit 22, an abnormal ID signal 120 is output to the system controller 27. The system controller 27 then lowers the packet output control signal 100 to L level to interrupt output of the packet and to perform initialization of the output control circuit 26, similarly to the process illustrated in FIG. 8.

The information SEQ and the information TPA has low reliability since only error detection based on the information in the region ID2. Similarly to the case of the start flag set forth above, reliability can be enhanced by matching direction or majority matching within a track, matching detection over continuous tracks or so forth. In FIG. 9, the abnormal ID signal is output to the system controller 27 when discontinuity is detected continuously over two tracks.

As set forth above, even for the medium, in which the start flag 67 is not stored, detection of the editing point 140 is possible. However, since it is possible to happen that the information TPA and the information SEQ becomes continuous at the editing point 140, it should be certain to use the start flag 67 in detection of the editing point.

Figure 10:
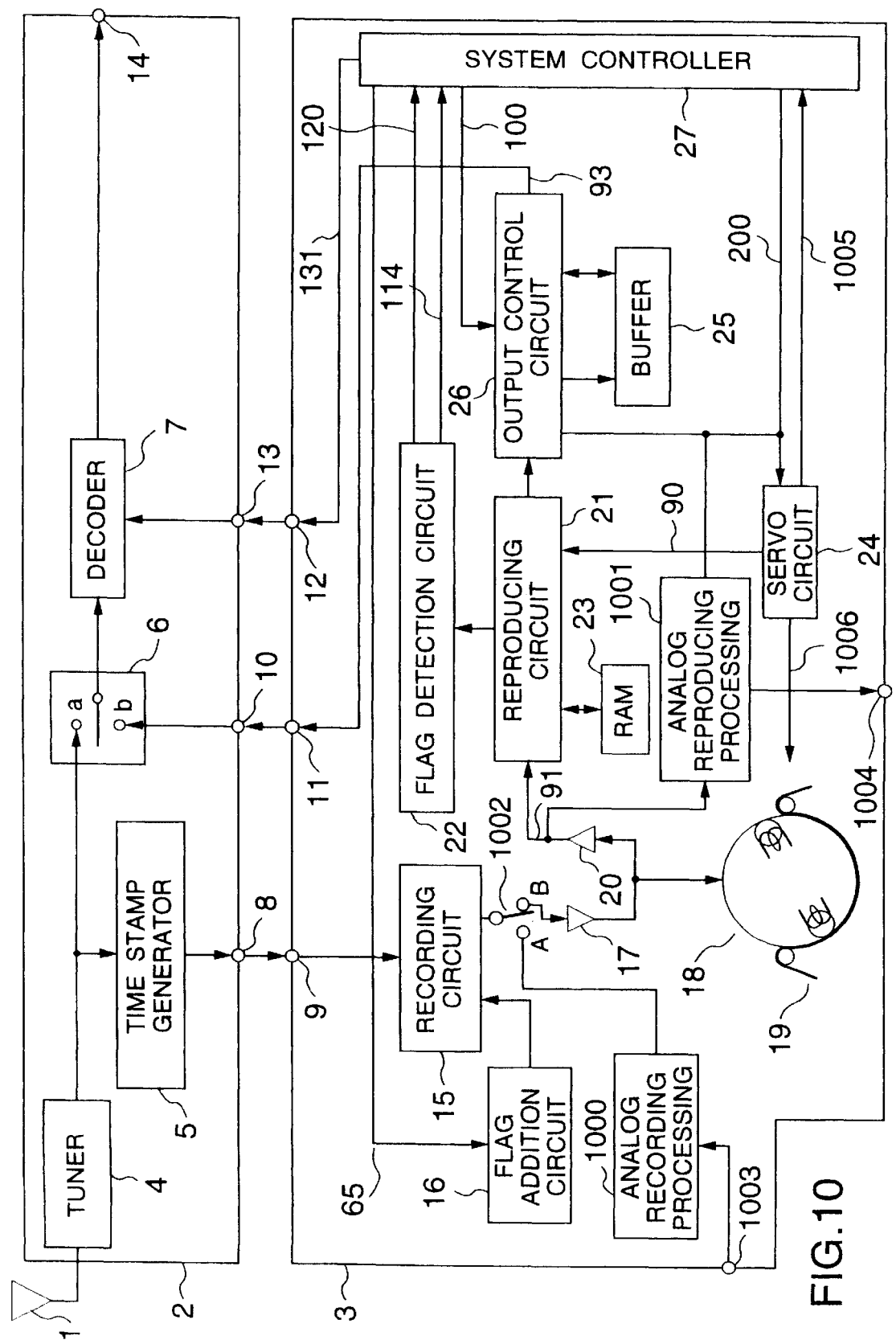
FIG. 10 is a block diagram showing another embodiment of a recording and reproducing control apparatus according to the invention.
Figure 11:
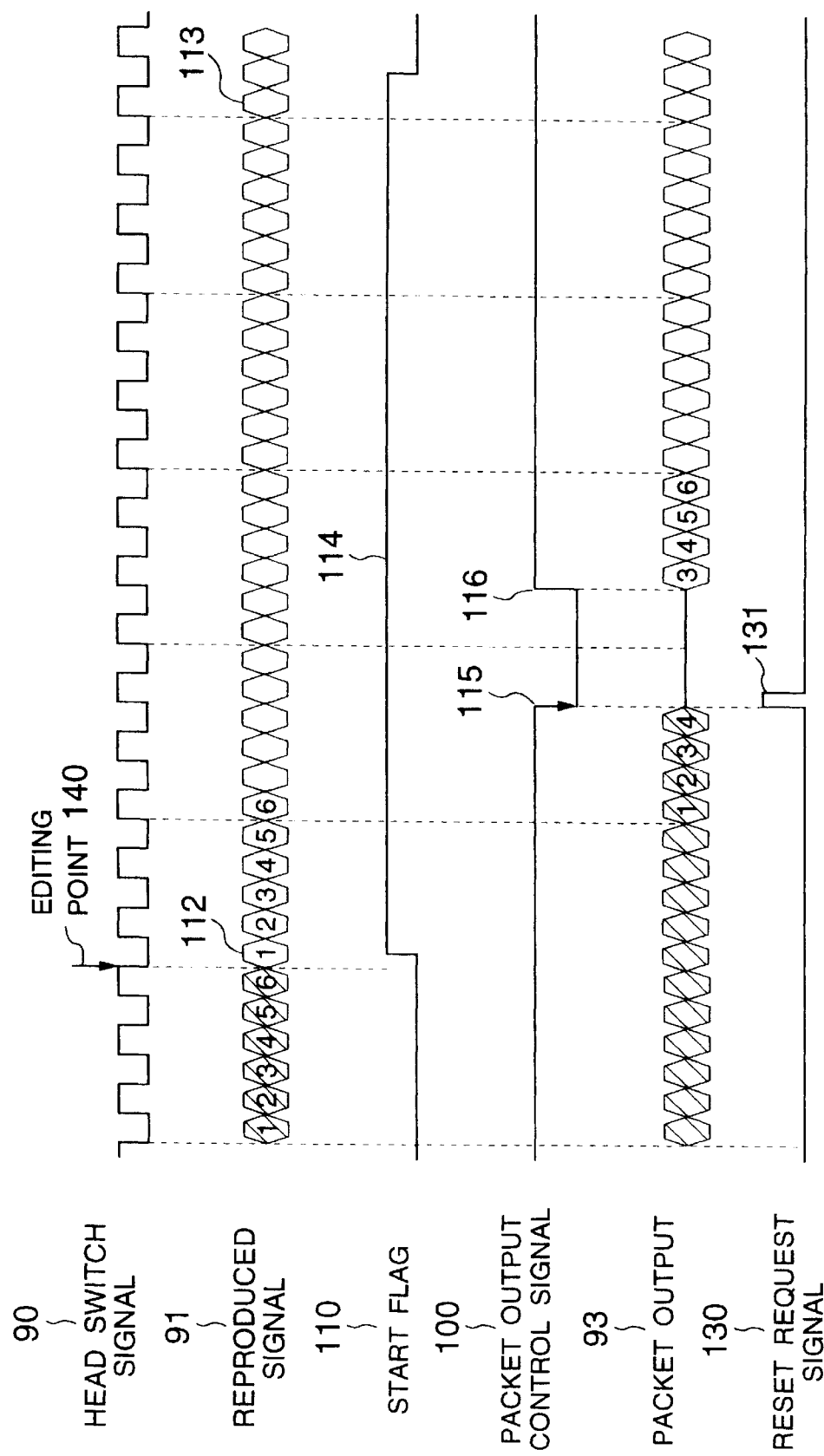
FIG. 11 is a chart showing an operation timing of the recording and reproducing control apparatus shown in FIG. 10.

While discussion has been given for interruption of output and initialization in the recording and reproducing apparatus 3 above, problem of discontinuity of the packet is remained. Namely, in FIG. 8, for example, the packets before the timing 115 and the packets after the timing 116 are not continuous on the time axis to thus possibly cause malfunction on the decoder 7 of the receiver 2. Therefore, as shown in FIG. 10 in a form of block diagram and in FIG. 11 in a form of a timing chart, within a packet output interruption period (from the timing 115 to the timing 116), malfunction can be certainly avoided and correct image signal and audio signal can be obtained immediately after the editing point when the system controller 27 outputs a reset request signal 131 to the receiver 2 to reset the decoder 7. In FIG. 10, the reference numeral 12 denoted a request signal output terminal, 13 denotes a request signal input terminal. The circuit construction shown in FIG. 10 is differentiated from the circuit construction shown in FIG. 1 in that the reset request signal 131 is output from the system controller 27 to the decoder 7, and the same in other construction. Therefore, like elements to those in FIG. 1 will be identified by like reference numerals and detailed description therefor will be neglected for avoiding redundant discussion.

The length of the packet output interruption period (from the timing 115 to the timing 116) can be a period covering a transmission period of the reset request signal 131 and a period required for resetting the decoder 7 in response to the reset request signal.

While the process based on the start flag 67 and the process based on the frame information are discussed separately In the foregoing disclosure, it is, of course possible to detect the editing point upon detection of either start flag 67 or discontinuity of the frame information.

It should be noted that while the magnetic tape is employed in the foregoing discussion, the present invention can be implemented even with other recording medium, such as a magnetic disc or the like.

Also, while the time stamp 42 is added by the receiver 2 as shown in FIG. 2, it is possible to add the same by the recording and reproducing apparatus 3 upon recording. In such case, the time stamp generating circuit 5 may be provided in the recording and reproducing apparatus. Furthermore, it is also possible that, in the mode where the time stamp 42 is included in the input data, the time stamp in the input data is recorded and, in the mode where the time stamp is not included in the input data, the time stamp 42 generated by the time stamp generating circuit 5 provided in the recording and reproducing apparatus 3, is recorded.

In FIG. 2 and other figures, the step of the time stamp 42 is set at the minimum interval between the packets, it is typical that the step of the time stamp 42 is much faster (e.g. 27 MHZ) and the intervals between the packets are much wider than the step interval of the time stamp.

In FIGS. 1 and 10, the pack data 65 as the recording packet and the packet output signal as the reproduced packet are transmitted to separate signal lines through separate terminals. However, it is possible to use the same terminal and same signal line commonly for inputting and outputting. Also, while the reset request signal 131 is transmitted independently through the independent signal line and the terminal, the reset request signal 131 may be transmitted on the packet signal line in multiplexed fashion.

Also, when a general digital signal is used in place of the compressed digital signal as the recording medium for recording the data, initialization of the output control circuit 26 is performed but interruption of the packet output is not always necessary.

In the shown embodiment of the recording and reproducing apparatus, there is provided a parity for performing detecting and correcting error even when reproduction error is caused. The C2 parity 56 and the C1 parity 76 of FIGS. 3 and 4 serve as this parity. As these parity, the parity of the Reed-Solomon code is employed, and error detection and correction is performed by means of the error control circuit 28. The error control circuit 28 outputs a C1 flag 29 when error correction by the C1 parity is not possible or a C2 flag 30 when error correction by the C2 parity is not possible, to an error counting circuit 1010 to count occurrence of error. The C1 flag 29 and the C2 flag 30 are also output to the storage circuit 23 and read out by the output control circuit 26 so as to take a certain measure, such that packet output is interrupted when both of the C1 flag and the C2 flag are generated. In conjunction therewith, the output control circuit 26 may output an output disabling flag 31 to the system controller 27.

The error condition becomes quite worse and number of packets, for which output is disabled, becomes large, decompression process by the decoder of the receiver 2 cannot be performed normally to cause noise in the image or sound or to cause hang-up. Therefore, by the system controller 27, number of occurrence of incapability of correction by the error counting circuit 1010 is monitored. If correction incapability count greater than or equal to a predetermined number occurs, the operation of the output control circuit 26 is interrupted by the packet output control signal 100 to interrupt output of the packet.

In the alternative, the C1 parity 66, the information ID1, the information ID2 and the like may also be used for error monitoring.

FIG. 17 shows operation timing in the case where error condition is bad, the reference number 114 denotes a flag detection signal indicative of result of error detection based on the information IDP1 and the information IDP2, 29 denotes a C1 flag indicative of the result of error correction based on C1 parity 66 or 76, and 31 denotes an output disabling flag indicating presence of the packet, in which the packet output becomes impossible. Here, detection of information of IDP1 and the information IDP2, and C1 decoding are processed within the reproduced track, and the flag detection signal 114 indicative of the result of the process and the C1 flag are output with the next track. The ID detection flag 114, the C1 flag 29 and so forth are counted by the error counting circuit 1010 as error count. The error count is input to the system controller 27 to be compared with a predetermined number per each track. If the error count is greater than or equal to the predetermined number, the packet output control signal 100 is lowered to be L level. When number of respective flags 114 and 29 becomes less than or equal to the predetermined number, the packet output signal 100 is again risen to be H level to output a reproduction start signal 131. In FIG. 17, in flag 114, 29 and 31, the tracks indicated with hatching are the tracks, in which errors greater than or equal to the predetermined number are detected.

As shown in FIG. 5, a packet output 93 is delayed for 11 tracks from reproduction. Therefore, the packet output control signal 100 is fallen down to L level with a delay for 10 tracks with respect to the flag detection signal 114 and the C1 flag 29. On the other hand, in some case, it is preferred that the packet output is not turned ON and OFF within a short period. Therefore, in the shown construction, the packet output is not switched ON and OFF at one track interval.

As shown in FIG. 17, due to error of the frame information at the tracks 300 and 301, the packet output is interrupted at the timing of 306, and the reproduction initiation signal 131 is output at the timing of 309. On the other hand, due to incapability of correction in the C1 decoding of the tracks 302 and 303, the packet output is interrupted at the timing of 307. The reproduction start signal 131 is output at the timing of 310. Due to incapability of correction in the C1 decoder from the track 304 to the track 305, the packet output is interrupted at the timing of 308, and the reproduction start signal 131 is output at the timing of 311. It should be noted that the output disabling flag 31 is delayed for one track at the timing of actual packet output 93, the packet output is interrupted when the flag 31 is greater than or equal to the predetermined number over the sequence of several tracks.

In the alternative, it is possible to directly count the result of C2 decoding performed in the error control circuit 28, as the C2 flag by the error counting circuit 1010 to output to the system controller 27. A timing in this case is shown in FIG. 18. In FIG. 18, the reference numeral 30 denotes the C2 flag and indicative of the result of error correction of the C2 decoding performed by the error control circuit 28. Similarly to FIG. 17, the track where the error in greater number than the predetermined number is illustrated with hatching.

Here, error is detected by the tracks 320 and 321 based on the frame information, and the error is detected by the track 321 on the basis of the C1 flag 29. In C2 decoding relating to this portion, the error is not detected. Therefore, all packets can be output. Due to error in the track 322, the flag is output in C2 decoding 327, and due to errors in the tracks 324 to 325, the flag is output in C2 decoding 328. In this case, since number of flags of the C2 decoding 327 is small, packet output is performed, whereas since number of flags of the C2 decoding 328 is large, packet output is interrupted.

As set forth above, by employing the C2 flag 30, precision of control of packet output can be enhanced. On the other hand, it is also possible to control the packet output control signal 100 aggregately in combination of the flag detection signal 114, the C1 flag 29 and the C2 flag 30.

On the other hand, it is possible to perform the ID detection circuit 22 by comparing the counted value of the flag of the flag detection signal 114 and the predetermined number. In the alternative, comparison can be made in the system controller 27. Also, comparison of the counted number of the flag of the C1 flag 29 and the C2 flag 30 with the predetermined number can be performed by the error control circuit 28. In the further alternative, counting of number of the flags can be done by the system controller 27.

On the other hand, when a cycle of ON and OFF of the packet output control signal 100 is too short, resetting is frequently caused in the decoder 7 to cause stopping of the image at every occurrence of resetting. Therefore, the ON and OFF cycle of the packet output control signal 100 set to be long in certain extent. For this purpose, the condition of number of errors to interrupt output and the condition of number of the errors to initiate output are set differently.

Namely, once the level of the packet output control signal 100 is lowered at L level, the packet output control signal 100 is risen to be H level when number of each flag is sequentially maintained smaller than or equal to the predetermined value over several tracks. On the other hand, it is possible to set the number of errors upon switching the packet output control signal 100 into L level at smaller number than the number of errors upon returning the packet output control signal into H level.

FIG. 19 shows a timing upon again rising the packet output control signal 100 when flag output is not present over sequential 20 tracks.

As shown in FIG. 19, by outputting the flag detection signal 114 at a timing 340, the packet output control signal 100 is switched into L level. Subsequently, since the flag detection signals 114 are output at a timing 341, a timing 342 and the C1 flag 29 is output at a timing 344 with an interval shorter than a period of 20 tracks, the packet output control signal 100 is not risen during this period. At a timing in excess of 20 tracks from the timing 342 of the flag detection signal 114, the reproduction start signal 353 is output to rise the packet output control signal 100.

Furthermore, another embodiment of the present invention will be discussed with reference to FIG. 1. In the shown embodiment, not only recording and reproduction of the digital signal, recording and reproduction of analog signal, such as VHS system analog signal.

Upon performing recording of analog signal, the terminal A of a switch 1002 is selected by the system controller 27, an analog signal input through an analog signal input through an analog signal input terminal 1003 is processed by an analog recording processing circuit 1000, and recorded on the magnetic tape 19 via the switch 1002. In this case, analog recording and digital recording are distinguished by setting the tape feeding speed of the magnetic tape 19 in analog recording at different speed to that in the digital recording, by a servo circuit 24. With taking the VHS system as an example, in the analog recording, a standard speed (SP mode) or one-third speed (EP mode) is used, and in digital recording, half speed of the SP mode (LP mode) is used. At the same time, by the servo circuit 24, a control signal synchronous with rotation of the rotary head is recorded on the magnetic tape 19.

Upon reproduction, a reproduction control signal 1007 is reproduced by the servo circuit 24 to control the feeding speed of the magnetic tape so as to establish synchronization between rotation of the rotary head 19 and the reproduction control signal 1007. As a result, when the feeding speed is in SP mode or EP mode, analog reproduction is judged, and when the feeding speed is in LP mode, digital reproduction is judged, to feed a mode detection signal 1005 to the system controller 27. The system controller 27 is responsive to the mode detection signal 1005 to generate an operation mode 200 to control respective components.

Figure 16:
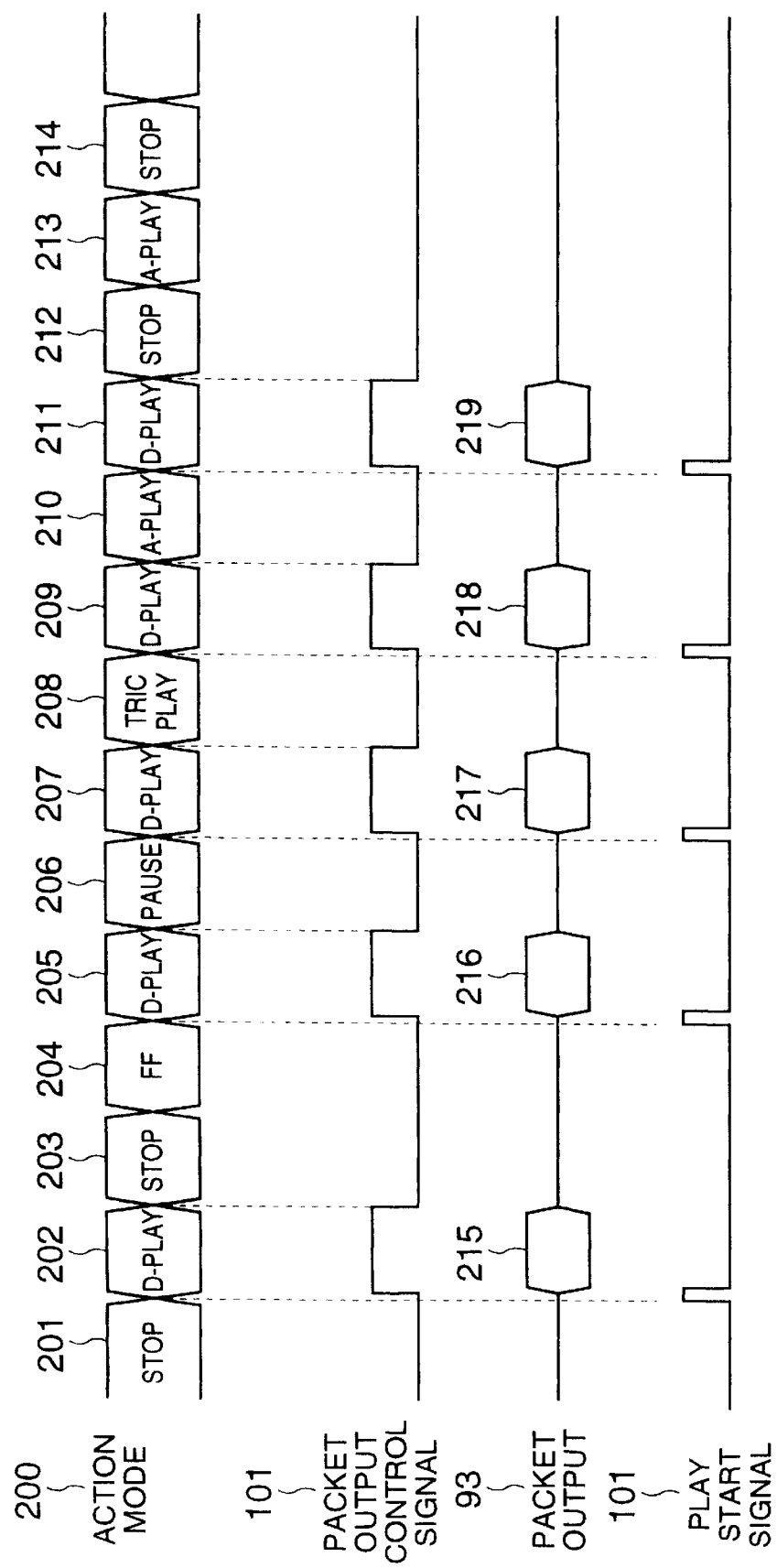
FIG. 16 is a chart showing operation timing upon switching of mode of the magnetic recording and reproducing control apparatus shown in FIG. 14.

FIG. 16 shows an example of operation, in which analog reproduction (A reproduction) and digital reproduction (D reproduction) are performed in admixed manner. Upon analog reproduction, a reproduced analog signal processed by an analog reproduction processing circuit 1001 is output through an analog signal output terminal 1004. On the other hand, the output control circuit 26 stops operation and output through the reproduced packet output terminal 11 is interrupted. Upon digital reproduction, the reproduced packet is output only through the reproduced packet output terminal 11, and the output from the analog signal output terminal 1004 is interrupted. Detail will be discussed later.

Figure 15A:
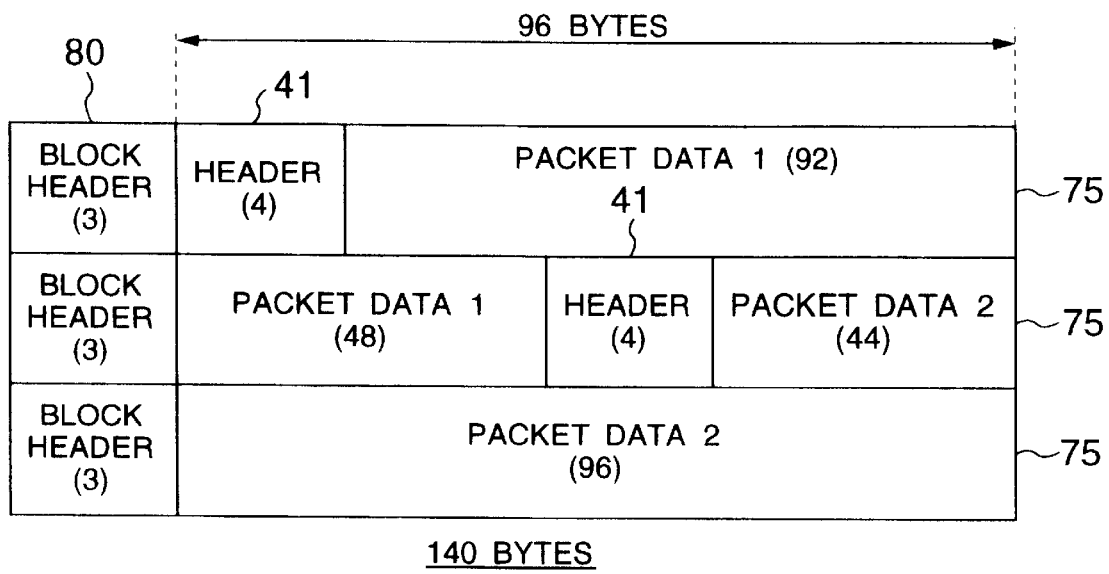
FIGS. 15A and 15B are explanatory illustration showing relationship of format of the packet and the block.
Figure 15B:
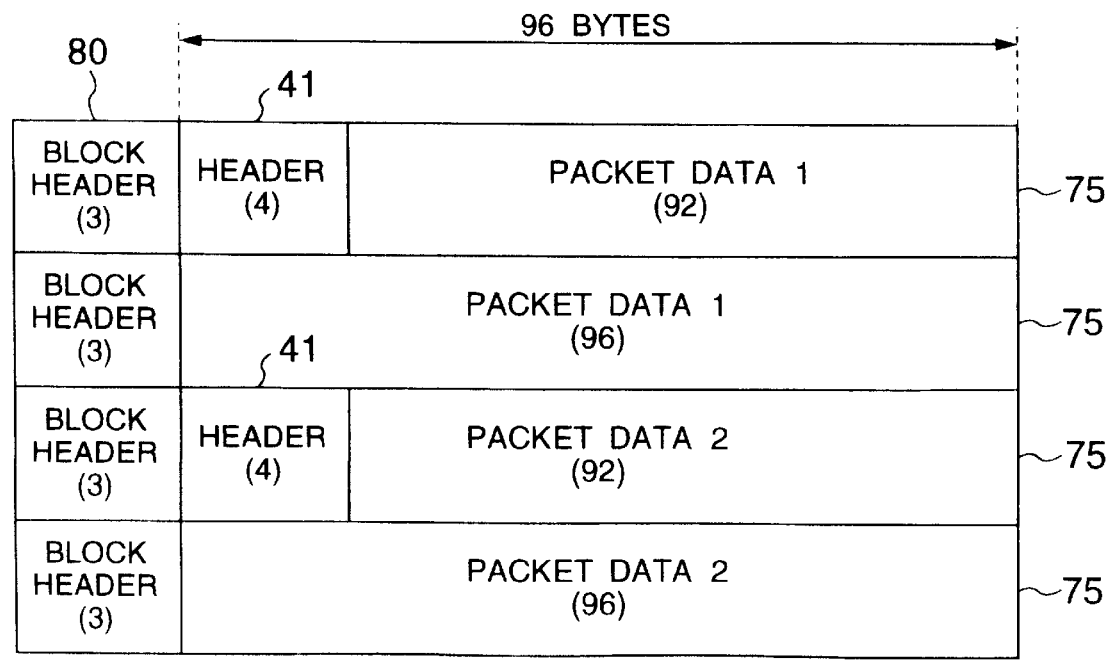

FIGS. 15A and 15B show relationship between the packet 40 shown in FIG. 2 and the block shown in FIG. 4B. In FIGS. 15A and 15B, the reference numeral 80 denotes a block header. The figure in the parenthesizes ( ) presents number of bites. FIG. 15A shows the case where the packet data contains 140 bites, in which two packets 40 are arranged in three blocks 75. On the other hand, FIG. 15B shows the case, in which the packet data contains 188 bites, in which one packet 40 is arranged in two blocks 75. It should be noted that since the shown system is adapted to the variable rate, number of packets to be transmitted in one track is not constant. Therefore, depending upon the transmission amount, dummy data is recorded in the portion, to which the packet is not transmitted, and in the block header, a flag indicative whether the corresponding block is the effective table or the dummy block.

Next, recording and reproducing operation in the recording and reproducing apparatus will be discussed.

Upon recording, the signal in the packet structure shown in FIG. 2, which is input through the recording packet input terminal 9, is added the C2 parity 56, the C1 parity 76 shown in FIG. 3 and so forth by the recording circuit, added the information of the region ID3, the region ID4 and the region IDP2 by the flag addition circuit 16, also added the synchronization signal 71, and provided a modulation process, and is then recorded in the main area 53 of the magnetic tape 19 by means of the rotary head 18 through the selected switch 1002 and the recording amplifier 17. On the other hand, the back data 65 is input to the ID addition circuit 16 by the system controller 27. To the back data 65, the information of the region ID1, the region ID2 and the region IDP1 are added by the ID addition circuit 16, and the synchronization signal 61 is added by the recoding circuit 51 to record in the sub-code area of the magnetic tape by the rotary head 18 via the recording amplifier 17.

Upon reproduction, the data stored on the magnetic tape 19 is reproduced by the rotary head 18 and a reproduction signal is fed to the reproducing circuit 21 via the reproduction amplifier 20. At the same time, the servo circuit 24 detects a digital mode by the reproduction control signal 1007 to output the mode detection signal 1005 to the system controller 27. In the reproducing circuit 21, the leading end of the block is detected on the basis of the synchronization signals 61 and 71 to store in the storage circuit 23. For a signal stored in the storage circuit 23, detection and correction of error of the main data by the C2 and C1 parities 56 and 76, and detection and correction of error of the back data 65 by the parity 66. On the other hand, by means of the ID detection circuit 22, detection of the information of the region ID1, the region ID2 in the sub-code area 51 is performed, error detection is performed by using the information of the region IDP, and error detection is performed using the information of the region IDP2, to output to the system controller 29 together with the back data 65.

It should be noted that since error detection and correction (referred to as C1 decoding) using the C1 parity 66 and C1 parity 76 is completed in every block, it can be performed before storing in the storage circuit.

The error detection and correction (C2 decoding) based on the C2 parity 56 is completed in every 6 tracks and thus is performed after reproduction of 6 tracks. After C2 decoding for reproduced data of 6 tracks, the result of decoding is temporarily stored in the buffer 25 via the output control circuit 26. The storage content of the buffer 25 is sequentially read out by detecting the time stamps included in the main data (FIG. 4B), at the interval indicated in the time stamps. The read out data is output through the reproduced packet output terminal 11. The output control circuit 26 controls turning ON and OFF of the packet output, initialization of the buffer 25 and so forth in response to the packet output control signal generated by the system controller 27.

When the reproduced image of the recording and reproducing apparatus 3 is processed by the receiver 2, the signal input through the reproducing packet input terminal 10 is fed to the decoder 7 by selecting the terminal b of the switch 6 to perform decoding process to obtain the image signal and the audio signal.

Next, the operation in switching modes such as stop, reproduction and the like will be described with use of a timing chart shown in FIG. 16. Referring to FIG. 16, 200 denotes an action mode including functions; and 101 denotes a play start signal for positing a reset timing to the decoder 7 in the receiver 2 through the control signal output terminal 12. Referring to the action mode 200, D-play 202, 205, 207, 209 and 211 means the digital reproduction shown in FIGS. 3 and 4, A-play 210 and 213 are not shown in the drawings but mean reproduction of the analog video signal. FF 204 means a high speed search in fast feed and fast rewind. Variable speed 208 means a low speed search in queue and review. Pause 206 means a temporarily stop controlled by the system controller 27.

As shown in FIG. 16, when the operation mode 200 is D reproduction 202, 205, 207, 209 and 211, the packet output control signal 100 is output to the output control circuit 26. In the output control circuit 26, output of the packet is interrupted while the packet output control signal 100 is in L level. At a rising end of the packet output control signal 100, the decoder 7 is reset and output of the packet is initiated. Also, at te rising end of the packet output control signal 100, a reproduction start signal 101 is output to the decoder 7 of the receiver 2, for example. As a result, as shown in FIG. 16, the actual packet outputs 93 become as illustrated in respective packet output periods 215 to 219.

When compression technology, such as the MPEG system, is employed, the data amounts in respective frames are not constant, and the frame of the compressed video signal and the frame of the recording and reproducing apparatus are asynchronous. Accordingly, ON/OFF control of respective packet outputs is performed irrespective of the frame of the compressed video signal to results in that data in the different frame may be output from the intermediate portion of the packet. For example, in FIG. 16, the packet outputs 215, 216 or 217, 218 becomes discontinuous since the magnetic tape is traveling in those period, other frame which is not continuous in the time axis may be output from the intermediate portion of the final frame of the packet output 215 and 217. Therefore, decoder 7 of the receiver 2 may cause malfunction to cause delay of rising of the video signal output or to cause hang-up to require resetting for resumption of operation.

Therefore, upon initiation of each packet output, the reproduction start signal 101 is output from the system controller 27 to reset the decoder 7 in advance of outputting of new packet. By this, since the decoder 7 can be reset every time of inputting of new packet, the video signal can be obtained certainly.

It should be noted that, while the rising edge of the reproduction start signal 101 is set to be much shorter than the rising edge of the packet output control signal 100 in FIG. 16, when resetting of the decoder 7 can be done quickly, it is possible to set the rising edge of the reproduction start signal 101 at the same timing as the packet output control signal 100.

On the other hand, control of initiation of reproduction on the basis of the flag discussed with respect to FIG. 14, and the control depending on the modes set forth above may be performed in combination.

Also, control of the editing point as illustrated in FIGS. 1 and 10 may be performed during a period of D-reproduction.

Also, the reproduction start signal 101 in FIG. 16 and the reproduction start signal 131 in FIG. 17 or so forth may be the same signal. BY this, number of communication codes to be received by the system controller 27 and the receiver 2 can be reduced to permit simplification of the specification of communication. Also, while the communication start signals 101 and 131 are discussed as simple signal, it may be communicated as command or status according to certain communication format. For example, while it is not specifically illustrated, by communicating the reproduction start signal as command in a P1394 format or CE-Bus format, a connector to be used can be common to that for the signal line for inputting and outputting the packet to facilitate connection.

It should be appreciated that, in the embodiment shown in FIGS. 16 to 19, the reproduction start signal is fed for resetting the decoder only upon initiation of output of the packet. However, it is also possible to feed a first signal upon interruption of packet output, such as interruption of reproduction, and to feed a second signal upon initiation of packet output, such as starting of reproduction. In this case, the decoder performs holding of preceding vide data or erasure of the video data in response to the first signal, and resumes decoding or is reset in response to the second signal.

Upon resetting, the decoder is initialized to the predetermined condition to start decoding.

Of course, the signal can be transmitted as a part of the information to be exchanged with the receiver. Also, the signal may be generated an apparatus controlling the recording and reproducing apparatus instead of the recording and reproducing apparatus.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A magnetic recording and reproducing apparatus including a receiver portion and a recording and reproducing portion for recording and reproducing a digital signal transmitted in a form of packet, together with a time stamp indicative of a transmission timing information of said packet structure, on a recording medium at least in said digital signal or in a frame structure, said recording and reproducing portion comprising:

input circuit for inputting said digital signal;

an identification information addition circuit for adding recording identification information indicative of recording identification for said digital signal input through said input circuit;

a recording circuit for recoding said digital signal with said recording identification information on said recoding medium;

a reproducing circuit for reproducing the content of said recording medium;

an identification information detecting portion for detecting said identification information from a reproduced signal reproduced by said reproducing circuit for outputting an identification information detection signal indicative of detection of the identification information;

a storage circuit for storing said reproduced signal;

a time stamp detection circuit for detecting said time stamp from said reproduced signal stored in said storage circuit;

an output control circuit for generating a timing for reading said reproduced signal from said storage circuit on the basis of said time stamp detected by said time stamp detection circuit;

a reset circuit for resetting said output control circuit in response to at least said identification information detection signal; and an output circuit for outputting said reproduced signal read from said storage circuit, said identification information addition circuit adding said recording identification information to said digital signal for a given period where said recording circuit initiating recording on said recording medium, and said reset circuit resetting said at least said control circuit upon detection of said recording identification information from said identification information detecting circuit.

2. A magnetic recording and reproducing apparatus as set forth in claim 1, wherein said identification information detection circuit outputs said identification information detection signal to said reset circuit and a discontinuity detection signal indicative of discontinuity of the packets in a time output from an axis in said output packet as said reproduced signal output circuit, to said reset circuit; when said recording identification information is detected by said identification information detection circuit, said reset circuit outputs a packet output control signal indicative of discontinuous packet discontinuing in time axis within said output packet to said output control circuit depending upon said identification information detection signal and said discontinuity detection signal, for resetting at least said output control circuit.

3. A magnetic recording and reproducing apparatus as set forth in claim 2, wherein said identification information detection circuit outputs said identification information detection signal when said recording identification information is detected sequentially for m (m is natural number greater than or equal to 2) times.

4. A magnetic recording and reproducing apparatus as set forth in claim 2, wherein said output control circuit include a reference time stamp generation circuit for generating a reference time stamp to be compared with said time stamp detected by said time stamp detection circuit, said reference time stamp generation circuit being initialized by said time stamp detected by said time stamp detection circuit, and said reset circuit resets said reference time stamp generation circuit in response to said packet output control signal.

5. A magnetic recording and reproducing apparatus as set forth in claim 1, which further comprises a time stamp generating circuit for measuring a period of the digital signal of the packet structure input from said input circuit, said digital signal in the packet structure being consisted of a first mode having said time stamp and a second mode having no time stamp, in said first mode, said time stamp contained in said digital signal is recorded on said recording medium, and in said second mode, the time stamp generated by said time stamp generation circuit is recorded on said recording medium.

6. A magnetic recording and reproducing apparatus as set forth in claim 4, wherein said output control circuit include a time stamp counter at least generating a time interval of transmission of said packet and a buffer for temporarily storing said reproduced signal, said time stamp counter and said buffer are reset by said packet output control signal generated in response to said identification information detection signal by said reset circuit.

7. A magnetic recording and reproducing apparatus as set forth in claim 1, wherein said receiver portion includes at least a decoder for decoding said digital signal into a video signal and an audio signal, said decoder being reset by a reset request signal generated by said reset circuit at least in response to said identification information detection signal.

8. A magnetic recording and reproducing apparatus as set forth in claim 1, wherein said recording identification information is a start flag indicative of a recording initiation point of said digital signal.

9. A magnetic recording and reproducing apparatus as set forth in claim 1, wherein said recording identification information is a frame information indicative of a position or an order of sequence of said digital signal to be recorded on said recording medium.

10. A magnetic recording and reproducing apparatus as set forth in claim 1, wherein said identification information addition circuit is a flag addition circuit for adding said start flag at the recording initiation point of said digital signal; said identification information detection circuit is a flag detection circuit detecting said start flag from said reproduced signal reproduced by said reproducing circuit, and whereby said reset circuit resets at least said output control circuit by a packet output control signal generated in response to said start flag detected by said flag detection circuit.

11. A magnetic recording and reproducing apparatus as set forth in claim 1, said input circuit includes a frame generation circuit for generating a frame period to have said digital signal at a constant time unit, said identification information addition circuit is a frame information addition circuit for adding the frame information generated by said frame generation circuit; said identification information detection circuit is a frame information detection circuit for detecting said frame information from said reproduced signal reproduced by said reproduction circuit, and includes a frame continuity detecting circuit for detecting continuity of the frame information per frame to output a frame information discontinuity signal upon detection of discontinuity, whereby said reset circuit resets at least said output control circuit and said decoder for decoding said digital signal into a video signal and an audio signal in response to said packet output control signal generated in response to said frame information discontinuity signal when the frame information detected by said frame information detection circuit is discontinuous.

12. A magnetic reproducing control apparatus having a reproduction portion for reproducing a digital signal, which is initially input as a digital signal in a form of packet structure and recorded on a recording medium together with a time stamp indicative of transmission timing information of said packet structure and a recording identification information indicative of a recording identification, in a form of the digital signal or in a form of frame structure, said apparatus comprising:

a reproduction circuit for reproducing a signal recorded on said recording medium;

an identification information detection circuit for detecting said recording identification information from a reproduced signal reproduced by said reproduction circuit;

a storage circuit for storing said reproduced signal;

a time stamp detection circuit for detecting said time stamp from said reproduced signal stored in said storage circuit;

an output control circuit for generating a timing for reading out said reproduced signal from said storage circuit on the basis of a timing information indicated by said time stamp detected by said time stamp detection circuit;

a reset circuit for resetting said output control circuit at least in response to said identification information detection signal; and an output circuit for outputting said reproduced signal read out from said storage circuit, said reset circuit resetting at least said output control circuit when said reproducing identification information is detected by said identification information detection circuit.

13. A magnetic reproducing apparatus as set forth in claim 12, wherein said identification information detection circuit outputs said identification information detection signal to said reset circuit and a discontinuity detection signal indicative of discontinuity of the packets in a time axis in said output packet as said reproduced signal output from said output circuit, to said reset circuit; when said recording identification information is detected by said identification information detection circuit, said reset circuit outputs a packet output control signal indicative of discontinuous packet discontinuing in time axis within said output packet to said output control circuit depending upon said identification information detection signal and said discontinuity detection signal, for resetting at least said output control circuit.

14. A magnetic reproducing apparatus as set forth in claim 13, wherein said output control circuit include a reference time stamp generation circuit for generating a reference time stamp to be compared with said time stamp detected by said time stamp detection circuit, said reference time stamp generation circuit being initialized by said time stamp detected by said time stamp detection circuit, and said reset circuit resets said reference time stamp generation circuit in response to said packet output control signal.

15. A magnetic reproducing apparatus as set forth in claim 13, wherein said identification information detection circuit is a frame information detection circuit for detecting said frame information from said reproduced signal reproduced by said reproduction circuit, and includes a frame continuity detecting circuit for detecting continuity of the frame information per frame to output a frame information discontinuity signal upon detection of discontinuity, whereby said reset circuit resets at least said output control circuit and said decoder for decoding said digital signal into a video signal and an audio signal in response to said packet output control signal generated in response to said frame information discontinuity signal when the frame information detected by said frame information detection circuit is discontinuous.

16. A magnetic reproducing apparatus as set forth in claim 15, wherein said output control circuit include a time stamp counter at least generating a time interval of transmission of said packet ans a buffer for temporarily storing said reproduced signal, said time stamp counter and said buffer are reset by said packet output control signal generated in response to said identification information detection signal by said reset circuit.

17. A magnetic reproducing apparatus as set forth in claim 12, wherein said reproducing portion includes a digital detection circuit detecting content of operation mode consisted of a digital reproduction mode for performing reproduction of said digital signal and a non-digital production mode other than said digital reproduction mode; a mode control circuit for switching into a digital reproduction mode when the digital signal recorded on said recording medium is detected by said digital detection circuit; a mode change information generation circuit for generating a mode change information when said mode control circuit switching from said digital reproduction mode into said non-digital reproduction mode and from said non-digital reproduction mode into said digital reproduction mode; a mode change information output circuit outputting said mode change information to said identification information detection circuit, said reset circuit resets at least one of said output circuit and decoder for decoding said digital signal into a video signal and an audio signal in response to said packet output control signal generated in response to said identification information detection signal when said identification information detection circuit outputs said mode change information.

18. A magnetic reproducing control apparatus as set forth in claim 17, wherein said non-digital reproduction mode is consisted of a stop mode, a pause mode, a fast feed/ rewinding mode, variable speed reproduction mode and an analog reproduction mode for reproducing an analog signal.

19. A magnetic reproducing control apparatus as set forth in claim 12, wherein said reproduced signal reproduced by said reproduction circuit includes a correction code, and which further comprises an error correction circuit performing either error detection or error correction of said reproduced signal depending upon said correction code, an error counting circuit counting number of error either error detection or error correction by said error correction circuit is disabled, an error information generation circuit for generating a first error information when the number of error counted by said error counting circuit reaches a predetermined number, and an error information output circuit for outputting said first error information to said reset circuit, said reset circuit resets at least one of said output control circuit and said decoder for decoding said digital signal into the video signal and the audio signal in response to said packet output control signal output in response to said first error information with respect to said predetermined number receiving said first error information.

20. A magnetic reproducing control apparatus as set forth in claim 19, wherein said error information generation circuit generates an output start information when said number of error counted by said error counting circuit once exceeds a first predetermined number, said number of error is reduced to be less than or equal to a second predetermined number, said error information output circuit outputs said reproduced signal from said output control circuit by outputting said output start information to said output control circuit.

21. A magnetic reproducing control apparatus as set forth in claim 17, wherein said error information generation circuit generates said output start information when said number of error is less than or equal to the predetermined number after switching into said reproduction mode by said mode control circuit, said error information outputting circuit outputs said output start information to said output control circuit to output said reproduced signal from said output control circuit.

22. A magnetic reproducing control apparatus as set forth in claim 21, wherein said error information generation circuit generates said output start information when said number or error counted by said error counting circuit at least exceeds a first predetermined number and then decreased to be less than or equal to a second predetermined number and when reproduction mode of said digital signal is once switched by said mode control circuit and then said number of error is decreased to be less than or equal to said second predetermined number, said error information output circuit octopus said output start information to said output control circuit.

23. A magnetic reproducing control circuit as set forth in claim 17, which includes said mode control circuit switching content of said operation mode consisted of the analog reproduction mode performing reproduction of the non-digital reproduced signal as analog signal and the non-analog reproduction mode other than said analog reproduction mode when said digital detection circuit detects said non-digital reproduction mode, said mode change information generation circuit generating said mode change information when said mode control circuit switches from said analog reproduction mode to said non-analog reproduction mode and from non-analog reproduction mode to said analog reproduction mode, and said mode change information output circuit directly outputting said mode change information to said reset circuit, and said reset circuit resets at least one of said output control circuit and said decoder decoding said analog signal into the video signal and said audio signal depending upon said mode change information.

24. A magnetic reproducing control apparatus as set forth in claim 23, wherein said non-analog reproduction mode is consisted of a stop modem a pause mode, fast feed/ rewinding mode, variable speed reproduction mode.

* * * * *

UNITED STATES PATENT AND TRADEMARK OFFICE
CERTIFICATE OF CORRECTION

PATENT NO.    : 6,085,023
DATED         : July 4, 2000
INVENTOR(S)   : Yuji Hatanaka et al.

It is certified that error appears in the above-identified patent and that said Letters Patent is hereby corrected as shown below:

Claims,
Please replace the original claims in the Letters Patent with the following allowed claims 1-3, 8-13, 15 and 17-22 (now renumbered as 1-16, respectively):
-- 1. A magnetic recording and reproducing apparatus included in a system comprising a receiver portion for receiving a digital signal transmitted in a form of packet, recording and reproducing portion for recording and reproducing said digital signal, and decoder portion for decoding a digital signal received by said receiver portion or reproduced by said recording and reproducing portion into a video signal and an audio signal, said recording and reproducing portion comprising:

input circuit for inputting said digital signal received by said receiver portion;

an identification information addition circuit for adding recording identification information indicative of recording identification for said digital signal input through said input circuit;

a recording circuit for recoding said digital signal with said recording identification information on said recording medium;

a reproducing circuit for reproducing the content of said recording medium;

an identification information detecting portion for detecting said identification information from a reproduced signal reproduced by said reproducing circuit for outputting an identification information detection signal indicative of detection of the identification information;

an output control circuit for outputting a digital signal reproducing by said reproducing circuit to said decoder portion; and a reset circuit for resetting said decoder portion;

said identification information addition circuit adding said recording identification information to said digital signal for a given period where said recording circuit initiating recording on said recording medium, and said reset circuit resetting said decoder upon detection of said recording identification information from said identification information detecting circuit.

2. A magnetic recording and reproducing apparatus as set forth in claim 1, wherein said identification information detection circuit outputs said identification information detection signal and a discontinuity detection signal indicative of discontinuity of the packets in a time axis in said output packet as said reproducing signal output control circuit, to said reset circuit; when said recording identification information or said discontinuity in a time axis are detected by said identification information detection circuit, said reset circuit resets said decoder depending upon said identification information detection signal and/or said discontinuity detection signal.

UNITED STATES PATENT AND TRADEMARK OFFICE
CERTIFICATE OF CORRECTION

PATENT NO. : 6,085,023
DATED : July 4, 2000
INVENTOR(S) : Yuji Hatanaka et al.

It is certified that error appears in the above-identified patent and that said Letters Patent is hereby corrected as shown below:

3. A magnetic recording and reproducing apparatus as set forth in claim 2, wherein said identification information detection circuit outputs said identification information detection signal when said recording identification information is detected sequentially for m (m is natural number greater than or equal to 2) times.

4. A magnetic recording and reproducing apparatus as set forth in claim 1, wherein said recording identification information is a start flag indicative of a recording initiation point of said digital signal.

5. A magnetic recording and reproducing apparatus as set forth in claim 1, wherein said recording identification information is a frame information indicative of a position or an order of sequence of said digital signal to be recorded on said recording medium.

6. A magnetic recording and reproducing apparatus as set forth in claim 1, wherein said identification information addition circuit is a flag addition circuit for adding said start flag at the recording initiation point of said digital signal; said identification information detection circuit is a flag detection circuit detecting said start flag from said reproduced signal reproduced by said reproducing circuit, and whereby said reset circuit resets said decoder portion by a packet output control signal generated in response to said start flag detected by said flag detection circuit.

7. A magnetic recording and reproducing apparatus as set forth in claim 1, said input circuit includes a frame generation circuit for generating a frame period, said identification information addition circuit is a frame information addition circuit for adding the frame information generated by said frame generation circuit; said identification information detecting circuit is a frame information detection circuit for detecting said frame information from said reproduced signal reproduced by said reproducing circuit, and includes a frame continuity detecting circuit for detecting continuity of the frame information per frame to output a frame information discontinuity signal upon detection of discontinuity, whereby said reset circuit resets said decoder in response to said packet output control signal generated in response to said frame information discontinuity signal when the frame information detected by said frame information detection circuit is discontinuous.

8. A magnetic reproducing control apparatus included in a system comprising a reproduction portion for reproducing a digital signal, which is initially input as a digital signal in a form of packet structure and recorded on a recording medium together with a recording identification information indicative of a recording identification, in a form of the digital signal or in a form of frame structure, and decoder portion for decoding at least a digital signal reproduced by said reproduction portion into a video signal and an audio signal comprising:

UNITED STATES PATENT AND TRADEMARK OFFICE
CERTIFICATE OF CORRECTION

PATENT NO.   : 6,085,023
DATED        : July 4, 2000
INVENTOR(S)  : Yuji Hatanaka et al.

It is certified that error appears in the above-identified patent and that said Letters Patent is hereby corrected as shown below:

a reproduction circuit for reproducing a signal recorded on said recording medium;
      an identification information detection circuit for detecting said recording identification information from a reproduced signal reproduced by said reproduction circuit;
      an output control circuit for outputting a digital signal reproduced by said reproduction circuit to said decoder portion; and
      a reset circuit for resetting said decoder portion in response to said identification information detection signal;
      said reset circuit resetting at least said decoder when said reproducing identification information is detected by said identification information detection circuit.
      9. A magnetic reproducing apparatus as set forth in claim 8, wherein said identification information detection circuit outputs said identification information detection signal and a discontinuity detection signal indicative of dis continuity of the packets in a time axis in said output packet as said reproduced signal output from said output control circuit, to said reset circuit; when said recording identification information or said discontinuity in time axis are detected by said identification information detection circuit, said reset circuit resets said decoder depending upon said identification information detection signal and/or said discontinuity detection signal.
      10. A magnetic reproducing apparatus as set forth in claim 9, wherein said identification information detection circuit is a frame information detection circuit for detecting said frame information from said reproduced signal reproduced by said reproduction circuit, and includes a frame continuity detecting circuit for detecting continuity of the frame information per frame to output a frame information discontinuity signal upon detection of discontinuity, whereby said reset circuit resets said decoder in response to said packet output control signal generated in response to said frame information discontinuity signal when the frame information detected by said frame information detection circuit is discontinuous.
      11. A magnetic reproducing apparatus as set forth in claim 8, wherein said reproduction portion includes a digital detection circuit detecting content of operation mode consisted of a digital reproduction mode for performing reproduction of said digital signal and a non-digital production mode other than said digital reproduction mode; a mode control circuit for switching into a digital reproduction mode when the digital signal recorded on said recording medium is detected by said digital detection circuit; a mode change information generation circuit for generating a mode change information when said mode control circuit switching from said digital reproduction mode into said non-digital reproduction mode and/or from said non-digital reproduction mode into said digital reproduction mode; a mode change information output circuit

UNITED STATES PATENT AND TRADEMARK OFFICE
CERTIFICATE OF CORRECTION

PATENT NO. : 6,085,023
DATED : July 4, 2000
INVENTOR(S) : Yuji Hatanaka et al.

It is certified that error appears in the above-identified patent and that said Letters Patent is hereby corrected as shown below:

outputting said mode change information to said identification information detection circuit or said reset circuit, said reset circuit resets said decoder in response to said identification information detection signal and/or said mode change information.

12. A magnetic reproducing control apparatus as set forth in claim 11, wherein said non-digital reproduction mode is consisted of a stop mode, a pause mode, a fast feed/rewinding mode, variable speed reproduction mode and an analog reproduction mode for reproducing an analog signal.

13. A magnetic reproducing control apparatus as set forth in claim 8, wherein said reproduced signal reproduced by said reproduction circuit includes an error correction code, and which further comprises an error correction circuit performing either error detection or error correction of said reproduced signal depending upon said error correction code, an error counting circuit counting number of error either error detection or error correction by said error correction circuit is disabled, an error information generation circuit for generating a first error information when the number of error counted by said error counting circuit reaches a predetermined number, and an error information output circuit for outputting said first error information to said reset circuit, said reset circuit resets said decoder in response to said first information.

14. A magnetic reproducing control apparatus as set forth in claim 13, wherein said error information generation circuit generates an output start information when said number of error counted by said error counting circuit once exceeds a first predetermined number, said number of error is reduced to be less than or equal to a second predetermined number, said error information output circuit outputs said reproduced signal to said reset circuit and/or output control circuit said output control circuit outputs said reproducing signal in response to said output start information, and said reset circuit resets said decoder in response to said output start information.

15. A magnetic reproducing control apparatus as set forth in claim 11, wherein said error information generation circuit generates said output start information when said number of error is less than or equal to the predetermined number after switching into said reproduction mode by said mode control circuit, said error information outputting circuit outputs said output start information to said reset circuit and/or said output control circuit to output said reproduced signal from said output control circuit, said reset circuit resets said decoder in response to said output start information.

UNITED STATES PATENT AND TRADEMARK OFFICE
CERTIFICATE OF CORRECTION

PATENT NO. : 6,085,023
DATED : July 4, 2000
INVENTOR(S) : Yuji Hatanaka et al.

It is certified that error appears in the above-identified patent and that said Letters Patent is hereby corrected as shown below:

16. A magnetic reproducing control apparatus as set forth in claim 15, wherein said error information generation circuit generates said output start information when said number of error counted by said error counting circuit at least exceeds a first predetermined number and then decreased to be less than or equal to a second predetermined number and when reproduction mode of said digital signal is once switched by said mode control circuit and then said number of error is decreased to be less than or equal to said second predetermined number, said error information output circuit outputs said output start information to said reset circuit and/or said output control circuit. --.

Signed and Sealed this

Twenty-seventh Day of November, 2001

*Attest:*

*Attesting Officer*

NICHOLAS P. GODICI
*Acting Director of the United States Patent and Trademark Office*